United States Patent
Alwehaibi et al.

(10) Patent No.: US 11,493,654 B2
(45) Date of Patent: Nov. 8, 2022

(54) CONSTRUCTION OF A HIGH-RESOLUTION ADVANCED 3D TRANSIENT MODEL WITH MULTIPLE WELLS BY INTEGRATING PRESSURE TRANSIENT DATA INTO STATIC GEOLOGICAL MODEL

(71) Applicant: Saudi Arabian Oil Company, Dhahran (SA)

(72) Inventors: Bandar A. Alwehaibi, Dammam (SA); Mohammed B. Issaka, Dhahran (SA); Noor M. Anisur Rahman, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 194 days.

(21) Appl. No.: 16/872,218

(22) Filed: May 11, 2020

(65) Prior Publication Data

US 2021/0349226 A1    Nov. 11, 2021

(51) Int. Cl.
*G01V 1/28* (2006.01)
*E21B 47/022* (2012.01)
*G06T 17/00* (2006.01)

(52) U.S. Cl.
CPC ............ *G01V 1/282* (2013.01); *E21B 47/022* (2013.01); *G06T 17/00* (2013.01)

(58) Field of Classification Search
CPC ........ G01V 1/282; E21B 47/022; G06T 17/00
See application file for complete search history.

(56) References Cited

U.S. PATENT DOCUMENTS

| | | |
|---|---|---|
| 4,803,873 A | 2/1989 | Ehlig-Economides |
| 7,274,993 B2 | 9/2007 | Hu et al. |
| 8,515,721 B2 * | 8/2013 | Morton ................ E21B 49/00 703/10 |
| 8,682,624 B2 | 3/2014 | Mariethoz et al. |
| 9,805,144 B2 | 10/2017 | Le Ravalec et al. |
| 9,896,930 B2 | 2/2018 | Al-Nahdi et al. |
| 9,945,224 B2 | 4/2018 | Proett et al. |

(Continued)

FOREIGN PATENT DOCUMENTS

| | | |
|---|---|---|
| AU | 2013397497 | 2/2015 |
| EP | 3101225 | 12/2016 |
| WO | WO 2016187238 | 11/2016 |

OTHER PUBLICATIONS

PCT International Search Report and Written Opinion in International Appln. No. PCT/US2021/031536, dated Jul. 23, 2021, 13 pages.

Al-Thawad et al., "Linking Well-Test Interpretations to Full Field Simulations," SPE Paper 81514 presented in MEOS, Bahrain, Mar. 11-14, 2007, 10 pages.

(Continued)

*Primary Examiner* — Raymond L Nimox
(74) *Attorney, Agent, or Firm* — Fish & Richardson P.C.

(57) ABSTRACT

Systems and methods include a method for generating a high-resolution advanced three-dimensional (3D) transient model that models multiple wells by integrating pressure transient data into a static geological model. A crude 3D model is generated from a full-field geological model that models production for multiple wells in an area. A functional 3D model is generated from the crude 3D model. An intermediate 3D model is generated by calibrating the functional 3D model with single-well data. An advanced 3D transient model is generated by calibrating multi-well data in the functional 3D model.

17 Claims, 18 Drawing Sheets

(56) References Cited

U.S. PATENT DOCUMENTS

| | | | |
|---|---|---|---|
| 2005/0119911 A1* | 6/2005 | Ayan | G01V 11/00 703/10 |
| 2006/0241867 A1* | 10/2006 | Kuchuk | E21B 49/00 702/13 |
| 2011/0040536 A1 | 2/2011 | Levitan | |
| 2011/0130966 A1 | 6/2011 | Zhan et al. | |
| 2011/0191029 A1 | 8/2011 | Jalali et al. | |
| 2013/0096897 A1 | 4/2013 | Shahri | |
| 2013/0297272 A1* | 11/2013 | Sung | G01V 99/005 703/10 |
| 2015/0120199 A1 | 4/2015 | Casey | |
| 2015/0185361 A1 | 7/2015 | Al-Nuaim et al. | |
| 2016/0116638 A1* | 4/2016 | Kuchuk | G01V 99/005 703/2 |
| 2016/0178800 A1* | 6/2016 | Ramsay | E21B 43/00 702/12 |
| 2017/0067325 A1 | 3/2017 | Zurita et al. | |
| 2017/0337302 A1* | 11/2017 | Mezghani | G06F 30/17 |
| 2019/0017352 A1 | 1/2019 | Chugunov et al. | |
| 2019/0025461 A1 | 1/2019 | Wiener et al. | |

OTHER PUBLICATIONS

Faisal M Al-Thawad, M.B. Issaka et al.: "A Simple Approach to Numerical Analysis of Complex Well Tests," SPE Paper 81514 presented in MEOS, Bahrain, Jun. 9-12, 2003, 13 pages.

Jackson et al., "Advances in Multilayer Reservoir Testing and Analysis using Numerical Well Testing and Reservoir Simulation," SPE 62917, SPE Annual Technical Conference and Exhibition, Dallas, Texas, Oct. 1-4, 2000, 14 page.

Mezghani et al., "Conditioning Geostatistical Models to Flow Meter Logs," paper SPE 65122 presented at the SPE European Petroleum Conference, Paris, France, Oct. 24-25, 2000, 10 pages.

Mijinyawa et al., "An integrated approach to well test analysis—use of numerical simulation for complex reservoir systems," SPE 140617, 34th SPE Annual Conference and Exhibition in Tinapa, Calabar, Nigeria, Jul. 31-Aug. 7, 2010, 11 pages.

Zhao et al., "A Well Tested Analysis Methodology and Application for Tight Reservoirs," Offshore Conference Asia held in Kuala Lumpur, Department of Petroleum Engineering, China University of Petroleum-Beijing, Mar. 22-25, 2016, 11 pages.

Zhu et al., "Analyzing Transient Pressure and Rate Responses of Tight Oil Reservoirs Using Comparative Numerical, Analytical and Semi-Analytical Methods," SPE Asia Pacific Hydraulic Fracturing Conference, Aug. 24-26, 2016, 29 pages.

* cited by examiner

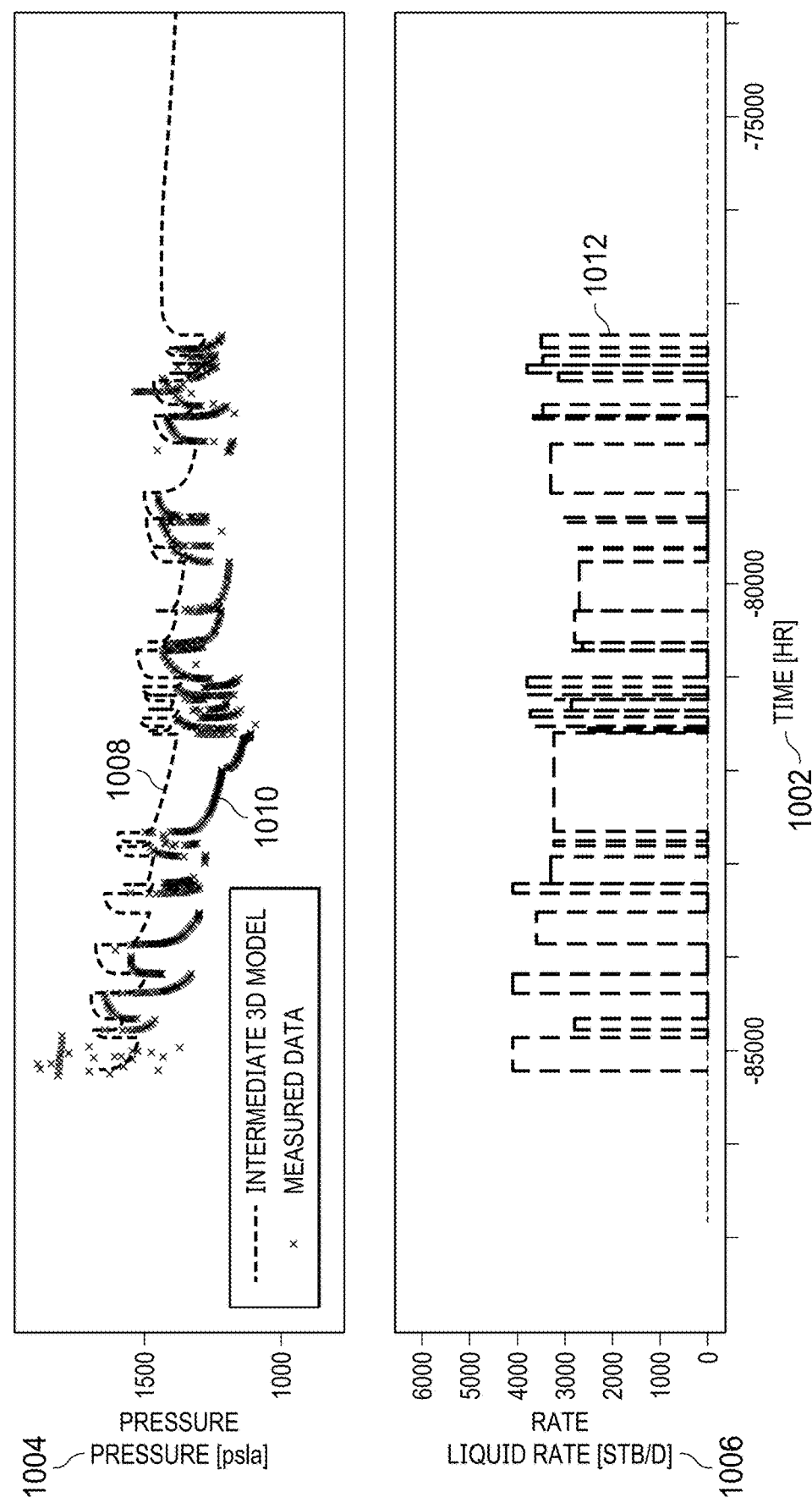

CONSTRUCTION OF A HIGH-RESOLUTION ADVANCED 3D TRANSIENT MODEL WITH MULTIPLE WELLS BY INTEGRATING PRESSURE TRANSIENT DATA INTO STATIC GEOLOGICAL MODEL

BACKGROUND

The present disclosure applies to using models associated with the production of petroleum reservoirs.

Multiple wells are sometimes used as conduits for producing hydrocarbons at commercial rates from underground reservoirs. Models can be built from available static and dynamic data to understand how fluids, pore spaces, and flow paths interact in the reservoir. Such models can be used to predict future behaviors of the reservoir. Conventional systems may concentrate on the performance of a well model without regarding reservoir properties.

SUMMARY

The present disclosure describes techniques that can be used for generating a high-resolution advanced three-dimensional (3D) transient model that models multiple wells by integrating pressure transient data into a static geological model.

In some implementations, a computer-implemented method includes the following. A crude 3D model is generated from a full-field geological model that models production for multiple wells in an area. A functional 3D model is generated from the crude 3D model. An intermediate 3D model is generated by calibrating the functional 3D model with single-well data. An advanced 3D transient model is generated by calibrating multi-well data in the functional 3D model.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, an advanced 3D transient model can be developed from a static geological model by incorporating and modeling pressure-transient results. Second, advanced 3D transient models can be developed to provide efficient history matching of full-field simulation models. Third, multi-well data can be used so that information for an entire region can be captured within a boundary of a sector model. Fourth, calibrating intermediate regions (areas between pairs of wells) can account for the interference between wells.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIGS. 10A and 10B are graphs showing examples of comparisons of the history plots, according to some implementations of the present disclosure.

Like reference numbers and designations in the various drawings indicate like elements.

DETAILED DESCRIPTION

Figure 1:
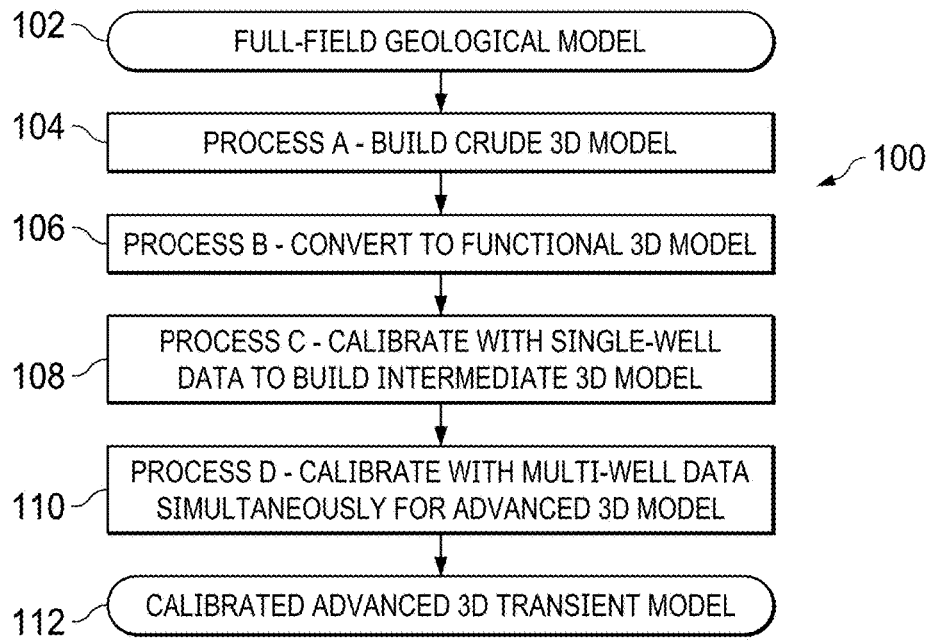
FIG. 1 is a flow chart showing an example of a workflow used to build an advanced three-dimensional (3D) transient model out of a full-field geological model, according to some implementations of the present disclosure.

The following detailed description describes techniques for generating a high-resolution advanced three-dimensional (3D) transient model with multiple wells by integrating pressure transient data into a static geological model. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Advanced 3D transient models described in the present disclosure can strike a balance between capturing the complexity of reservoir geology and fluid interactions, while keeping the computational loads within reasonable limits. Having multiple wells considered in the model can help to capture realistic in-situ fluid dynamics in a heterogeneous reservoir system under actual operating conditions, including when the reservoir contributes to the production of hydrocarbons. Advanced 3D transient models, when incorporated into a larger simulation model, can enable the large simulation model to act as a reliable predictor of future performance of the reservoir.

A systematic procedure can be developed to build advanced 3D transient models from a static geological model. The models can be calibrated so that the models honor the results of pressure-transient analysis. Using long-term pressure and rate data in multiple wells while calibrating the models can allow a modeler to build the models comprehensively and with high confidence. When advanced 3D transient models are used with respective full-field simulation models, a history-matching process can be used to make model development more efficient and accurate. As an example, the models can focus on reservoir properties that dominate the short-term and long-term performance of the wells within the selected models.

A comprehensive workflow can be used to calibrate a sector of a static geological model with long-term pressure and rate data of multiple wells located within a sector. This approach can be used instead of conventional approaches that calibrate only on a single-well basis. Calibrating dynamically with the data of multiple wells can allow a modeler to describe or characterize the intermediate reservoir regions among wells with more certainty. Long-term behaviors of a well are known to be controlled by the reservoir properties in the vicinity, and in the intermediate reservoir regions among the wells. Advanced 3D transient models built through the steps of a comprehensive workflow can be expected to capture the actual operating conditions in the field in the long term. As a result, when incorporated into the full-field reservoir simulation model, the advanced 3D transient models can provide a significant role during the history matching stage.

In some implementations, techniques of the present disclosure can be used during the following example of a development process. Iterative models can be built and used to discover trends in workflows. Prototypes and operational applications can be constructed. Ideas for improvement of workflow and efficiency can be incorporated. Results of techniques and practical aspects can be proven. Numerical models can be refined to match current operations. Numerical modelling techniques can be used for pressure transient analysis. Numerical model workflows can be improved by integrating dynamic data. Studies can be performed using the methodologies in order to observe systematic patterns. The techniques can be applied in building advanced 3D transient models of oil reservoirs.

Multiple experiments can be performed to ensure that workflows provide systematic outcomes. The existence of multiple wells can improve the matching process. Matching with long-term data of multiple wells can be especially helpful in calibrating intermediate regions located between wells which may be beyond the radii of investigation of respective buildup and fall-off tests of individual wells. In this way, an entire sector model can be calibrated with pressure-transient data to perform as an advanced 3D transient model. The calibrated advanced 3D transient model can provide a high confidence of performing well under actual field conditions. As a result, full-field reservoir simulation models can make the history-matching processes significantly less cumbersome. Results of experimentation are provided and described with reference to FIGS. 11-15.

A comprehensive workflow can integrate and incorporate a geological reservoir model with pressure transient data, resulting in an advanced three-dimensional (3D) dynamic transient reservoir model. Such models can utilize data from multiple wells in a reservoir system. The comprehensive workflow can present a procedure and steps for transferring a sector with multiple wells from a geological model of the reservoir (called a static model) to an operational platform as a crude 3D model. A modeler can match the pressure transient data to bottom-hole pressure performance of each well, especially as related to build-up or falloff periods. Ultimately, a multi-well dynamic transient model can be transferred back to the geological model after being integrated. Objectives for building multi-well 3D transient models can include calibrating more regions of the geological model with the dynamic permeability of the pressure transient data, and assessing the connectivity between wells involved in the sector.

Approaches described in the present disclosure can be used to optimize the running time of the multi-well advanced 3D transient model. For example, optimizing can refer to achieving execution times indicating a performance greater than a predefined threshold. Optimization can allow for running many scenarios, with different properties, and reaching an improved match in a practical time scale. The transient model can accurately capture the pressure transient behaviors of each well. Refined grids can be determined for the transient model. Complexities in the geological model can be simplified in cases in which the simplification does not misrepresent pressure transient behavior.

Workflows can incorporate the development of advanced 3D transient models by integrating geological reservoir models with the results of pressure transient analysis. An advanced 3D transient model can serve as an intermediate step between the geological model and the reservoir simulation model in a big picture that includes the full-field reservoir simulation model. The advanced 3D transient model can reduce the time and effort required during the matching of the whole reservoir model in a standard reservoir simulator.

Workflows described in the present disclosure can be used to transform the static geological model into a dynamic reservoir model, using the results of pressure-transient analysis. As such, updates obtained from the dynamic model can include the dynamic permeability capture of reservoir performance. The techniques of the present disclosure can rely on the following glossary of terminology.

Glossary of Terms

An Advanced 3D Multi-Well Transient Model is a dynamic model that can be built using a sector model from a geological model. This is an ultimate outcome of the workflow described in the present disclosure. The model can include all the reservoir characteristics obtained from the geological model. The model can further use the dynamic data such as the production/injection data, pressure, volume, and temperature (PVT) data, relative permeability, and the capillary-pressure function. A 3D transient model can be built in order to accurately capture the pressure-transient behaviors of all wells involved in the model. The 3D transient model can be simplified while still capturing the accurate response of pressure transient data.

A Capillary-Pressure Function is associated with the viability of a reservoir that depends upon three parameters, which can be considered critical parameters. The first parameter is the porosity of the reservoir rock, which defines the pore space available for reservoir fluids, including hydrocarbons. The second parameter is the permeability, which defines the ease of extracting any hydrocarbons in place. The third parameter is the hydrocarbon saturation, which defines how much of the pore space is occupied by hydrocarbons. The third parameter and the related gas and water saturations can be controlled by capillary pressure. Capillary pressure (Pc) can be required to define the transition zone in a two-phase or a three-phase system. This data can originate from either petrophysical logs or laboratory analyses. A saturation function can define how saturation changes (or is expected to change) at a particular location of the reservoir.

Core Data can include core samples taken out of actual reservoir formations under in-situ conditions during drilling phase of the wells, which can provide valuable data on reservoirs and fluids. Core data may only be collected in a few wells depending upon the objectives. Core data samples can be transferred to a laboratory for detailed analyses. When available, core data can provide more reliable reservoir fluid properties than petrophysical log data. In some cases, core data can be used to adjust or calibrate log data. This may be done because core data can be considered more reliable than the log data. In cases in which core data is not available, techniques can rely on petrophysical log data. If core data in offset wells is available, then the core data can also be used for enhancing reservoir descriptions.

Fluids Contacts can be considered when more than one fluid exists in the reservoir, making fluid-contact information important. Fluids phases, including gas-to-oil and oil-to-water, can change with depth in reservoirs that include multiple fluids. The depth at which the fluid type changes is called a fluid-contact depth. Fluid contacts can define the depths of interfaces between two adjacent phases (for example, gas-to-oil, oil-to-water, and gas-to-water interfaces) in the reservoir. These depths can become references for pressure calculations in transient models.

A Geological (Static) Model is a geological model that can be built using all static data (including geology, geophysics, petrophysical, fluid contacts, and core data) that provide characteristics of reservoir properties. The geological model also includes drilled wells with their trajectories. The geological model is the first step in modeling any field, and is usually built for the full field before being converted to a full-field dynamic simulation model. The geological model usually does not include dynamic data.

Geology and Geophysics Data can be collected from the field seismic survey. Collected seismic field data can be input into the workflow where the data can be analyzed and interpreted to derive geological structures, rock typing, and reservoir features (including fractures, faults, and unconformity) of the reservoir. As the seismic data has the capability of capturing only large features in the field or the reservoir, localized geological features may be missed, such as fractures, faults, and unconformity. Based on the shape of the reservoirs, structural maps (for example, contour maps) can be generated by using depth scales. By using contour maps along with seismic interpretation, rock typing can be determined. Reservoir structures as interpreted from seismic data can be incorporated in numerical models if structural contour maps are available from seismic data.

An Operational Platform can serve as a computer-aided enabler in performing specific operations on a sector model that is regarded as an operational platform. Such a platform can execute requests for visualization of, and computational operations on, uploaded models. The operational platform can also display input parameters and field data, compute model outputs, and compare model outputs to field data. The operational platform can also have the capability of simplifying well trajectories, production data, and injection data to reduce the computational burden. Manipulation of grids, including upscaling and refining as needed, can also be performed on sector models.

Petrophysics can refer to reservoir properties (for example, permeability, porosity, saturations, and pay thickness) originating from petrophysical log data to build static geological models. Petrophysical logs can be built during the drilling phase of the well. Logging tools can be run in-hole. Wellbore, rock, and fluid information can be collected, which can later be processed and analyzed to estimate detailed reservoir properties such as permeability, porosity, saturations, and thickness. Petrophysical logs can provide the resolution needed to pick up localized features in the well or in the vicinity of the well. Logs can be the primary sources of most important and reliable data, providing a detailed description of the rock, fluid, and well. This information can be input to static geological models. In case a given subject well does not have petrophysical information, modelers can turn to other offset wells for petrophysical data for building the models.

PVT Data includes pressure, volume, and temperature data, which serve as reservoir fluid properties. A PVT analysis can include the process of determining the fluid behaviors and properties of oil, water, and gas samples from a reference well. Fluid samples for PVT analyses can be collected from a well during a drilling phase or a production phase of the well. The PVT data can also help in defining the phase behavior of reservoir fluids. Formation volume factors, viscosity, gas gravity, gas-oil ratio, and water salinity data can be used in a dynamic reservoir model. The PVT data use can be based on the number of phases (for example, two or three phases) in the reservoir.

A Reference Point is a depth at which all gauges are set to measure pressure data. The pressure at the reference point (for example, the gauge depth of the pressure measurement) can be required to initialize and simulate the pressure transient data in the transient model. Models can calculate simulated pressures at the reference point.

Relative Permeability refers to a concept used to enforce a preferential level of flow capacity due to the presence of multiple fluids at a given location in the reservoir. Relative Permeability can depend upon pore geometry, wettability, fluid distribution, and fluid saturation history. Relative permeability measurements can be conducted on core samples in a laboratory. Relative permeability measurements can be both time-consuming and expensive to produce.

As an example, in a single-phase fluid system, such as a dry gas or an under-saturated oil reservoir, the effective permeability of flow of the mobile fluid through the reservoir may vary a little during production because the fluid saturations do not change much. However, when more than one phase is mobile, the effective permeability to each mobile phase can change as the saturations of the fluids change in the reservoir. In the multiphase flow of fluids through porous media, the relative permeability of a phase can be a dimensionless measure of the effective permeability of that phase. The relative permeability can be represented as the ratio of the effective permeability of that phase to the absolute permeability. Relative permeability can be required for the calculation of permeability in each phase.

Reservoir Initial Conditions refer to the conditions when a well was drilled or before the well was subjected to any production or injection. The pressure and temperature data collected at that time is called the initial pressure and temperature of the reservoir. In addition, depths of the oil-water contact (OWC) and the gas-oil contact (GOC) need to be captured as well. These initial conditions can be utilized to build a hydro-dynamically balanced version of the transient model before the production and injection occur.

Well Control, Pressure-Transient Data, and Production Rates, when used in executing transient modeling, help to define well data in the well. In well control parameters, well history with reference to transient time can be defined. The production or injection history in different phases (for example, oil, water, or gas) separately can also be defined. The production or injection history can be required to match the pressure-transient data. Information for all flow, buildup, and fall-off periods of the wells can be defined in the data. Transient data of the measured pressures and production rates can be input into the transient model so that the information can be matched with the corresponding model predictions during simulation runs. The transient data of the measured pressures and the production rates can also help to accommodate any constraints. The constraints can be used, for example, to assure that well production rates and pressures do not go below or exceed certain limits during production or the shut-in phase. Constraints can be optional.

Well Trajectory and Completion Data includes a well trajectory defining the well path along which the well is drilled in a reservoir. In the past, wells were drilled vertically into the ground, and the well trajectory was essentially a straight, vertical line. In current operations, wells can be drilled so that the well trajectory can be horizontal, deviated, and curved. A numerical model can be used to capture the actual well trajectory. However, complex well trajectories may be numerically expensive for generating simulated pressures.

Well Completion is the process of making a well hydraulically connected to the intersecting reservoir to facilitate production or injection. Well completion principally involves preparing the bottom of a hole to required specifications, and running in the production tubing. Well completion is associated with downhole tools, including perforating and stimulating as required. Types of perforation can be based on the type of completion, for example, open-hole or cased-hole completions.

Description of Workflow

Workflows can be started or initiated using a full-field static geological model. In some cases, is may be necessary to consider only one sector model taken out of the geological models containing multiple production or injection wells. The wells can be considered one at a time. A corresponding advanced 3D transient model can be built that complies with long-term transient data in the wells. The advanced 3D transient model can be built so as to produce a dynamic model. The advanced 3D transient model can account for the dynamic fluid behavior within the model under actual operating conditions. A primary objective of this workflow is to build one advanced 3D transient model at a time from a full-field geological model.

Building an Advanced 3D Transient Model with Multiple Wells

FIG. 1 is a flow chart showing an example of a workflow 100 used to build an advanced 3D transient model out of a full-field geological model 102, according to some implementations of the present disclosure. In some implementations, the workflow 100 can include four major steps, as illustrated in FIG. 1.

At 104, in Process A, a crude 3D model is built. At 106, in Process B, the crude 3D model is converted to a functional 3D model. At 108, in Process C, the 3D model is calibrated with single-well data to build an intermediate 3D model. At 110, in Process D, the multi-well data is calibrated simultaneously to create an advanced 3D model. As shown, four major processes (Process A, Process B, Process C, and Process D) can be completed between the full-field geological model 102 and the final product, a calibrated advanced 3D transient model 112. Each of these processes A-D is presented in the following paragraphs. Selection of the sector model in the reservoir can require critical modeling knowledge. The modeler needs to know the objectives of building advanced 3D transient models ahead of time so that the chosen territory of the sector model and the wells contained within can serve the objectives of building such advanced 3D transient models.

Process A—Building a Crude 3D Model

Figure 2:
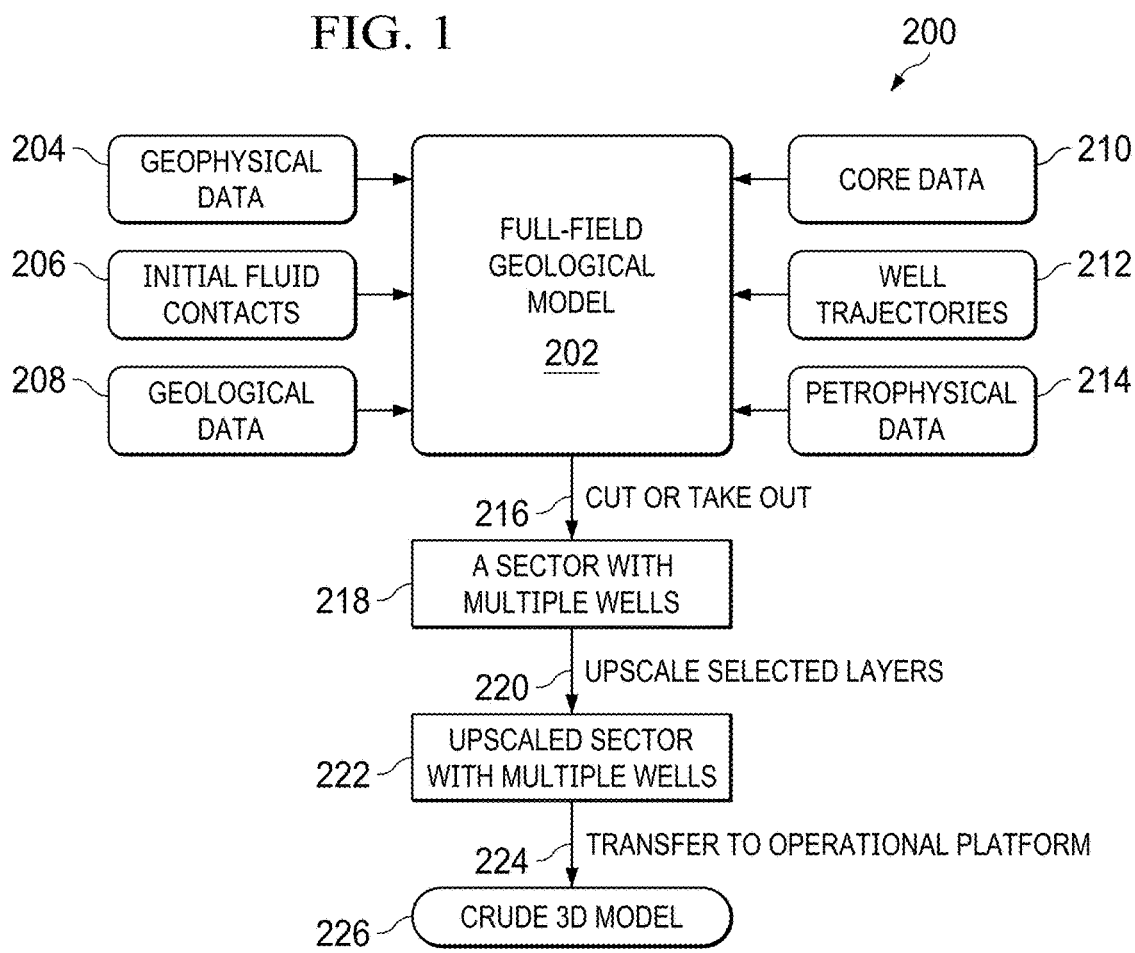
FIG. 2 is a flow chart showing an example of a workflow for building a crude 3D model out of a full-field geological model, according to some implementations of the present disclosure.

FIG. 2 is a flow chart showing an example of a workflow 200 for building a crude 3D model out of a full-field geological model 202, according to some implementations of the present disclosure. Process A, represented by the workflow 200, can be used to implement step 104 of FIG. 1, for example. Inputs to the full-field geological model 202 include geophysical data 204, initial fluid contacts 206, geological data 208, core data 210, well trajectories 212, and petrophysical data 214.

Cut Sector Model

At 216, a sector model with multiple wells is taken out, creating a sector 218 with multiple wells. The sector model is smaller in size than the full-field geological model 202 (which is based on all geological, petrophysical, and core data of the reservoir). As a result, the sector model represents the reservoir understanding from static data. Permeability in the model is populated using properties from logs at well locations and by using geo-statistics. The sector can involve multiple wells, for example, one or more groups of producers or injectors. The wells can be required to have continuous pressure and rate measurements through downhole and surface instruments. A long history, spanning from a few months to a few years, can be used to capture the pressure-transient behavior in the model. As an example, the sector model can involve a total 12 wells, including seven producers and five injectors.

Upscale Selected Layers

At 220, selected layers are upscaled during a vertical upscaling process, creating an upscaled sector 222 with multiple wells. The processing can occur on the sector model before transferring the sector model to the operational platform to act as a crude 3D model. The objective of the upscaling is to reduce the computational load so that the model can provide simulated pressures within a reasonable running time. This can reduce the time needed to match the pressure transient data. Upscaling can be achieved in such a way so as not change or negatively influence the pressure transient behaviors of the sector model prior to the upscaling process. Further, the upscaling should not cause any loss of reservoir features that would change the pressure transient behavior, for example, by removing tight layers. In an example application of upscaling, two layers that have minor changes in permeability will not unnecessarily increase the running time. Further, upscaling these layers will not alter the pressure transient behavior nor change the model results significantly. The optimum number of layers can typically fall to between 40 to 70 layers, for example.

Figure 3B:
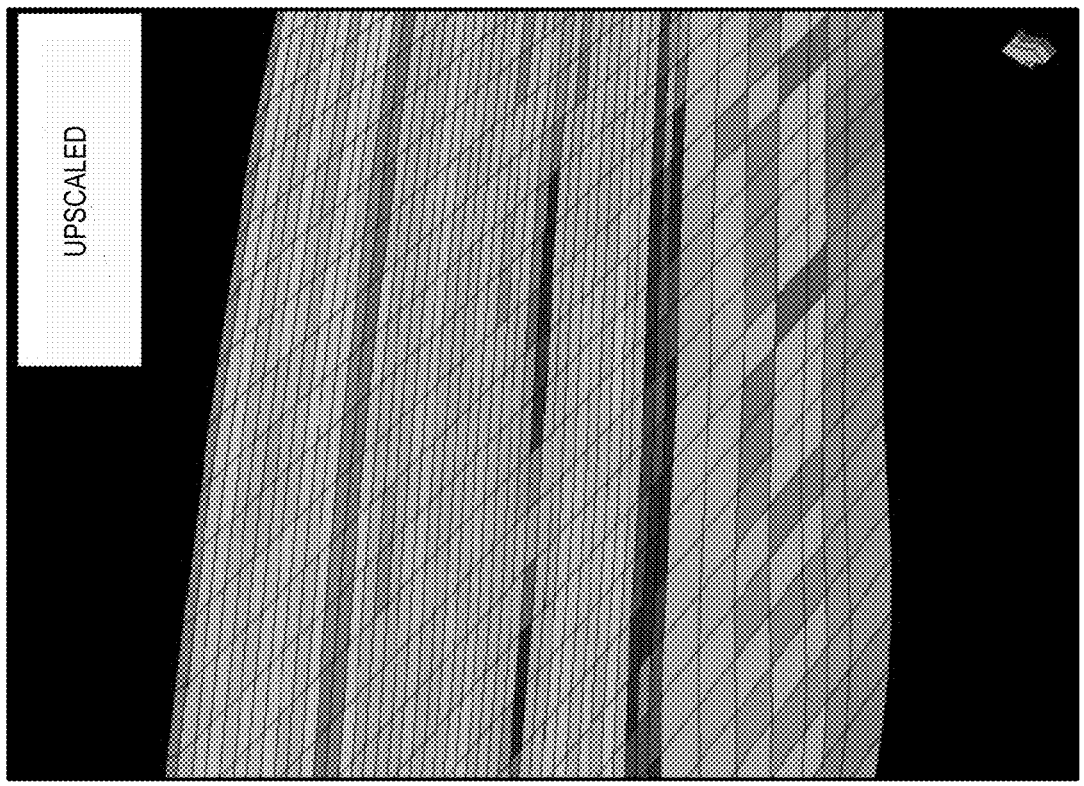
FIGS. 3A and 3B are plots showing examples of effects of upscaling on number of layers in the crude model, according to some implementations of the present disclosure.
Figure 3A:
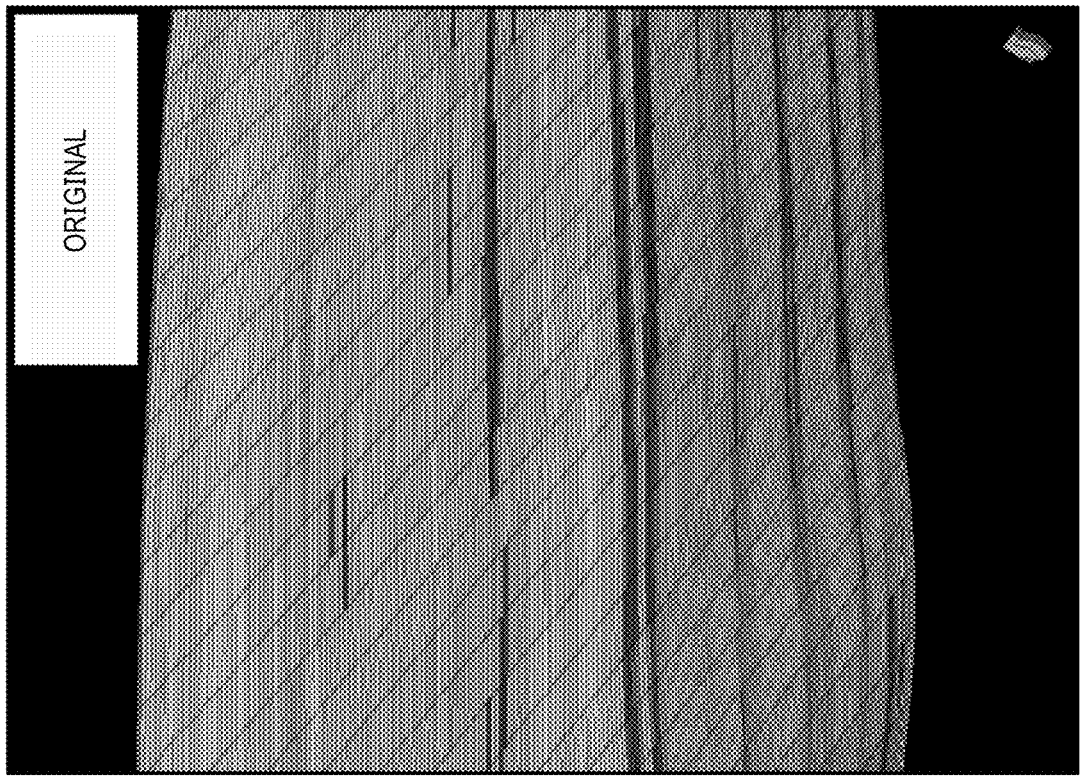

FIGS. 3A and 3B are plots showing examples of effects of upscaling on number of layers in the crude model, according to some implementations of the present disclosure. Upscaled plot 350 is the result of upscaling from original plot 300, for example. The upscaling process can require a careful study of the permeability variations among each layer in the sector model. The careful study can be performed by creating and comparing many cross-sections across the sector model. Also, generating pressure transient responses before and after the upscaling, using the wells involved in the sector, can assist in achieving efficient upscaling. An example of a property that controls the upscaling process is the static permeability in the sector model. FIGS. 3A and 3B show the effects of upscaling from 210 layers to 47 layers, for example.

Transfer Upscaled Sector to Operational Platform

At 224 (FIG. 2), once a satisfactory upscaled sector model has been built, the upscaled sector is transferred to an operational platform where it acts as a crude model 226. Transferring the sector model to the operational platform can be performed after completing the upscaling the static permeability and porosity. This transfer can be implemented through a software plugin, for example. The subject wells with their trajectories and the property sets are transferred as a crude 3D model.

Process B—Build Functional 3D Model

Figure 4:
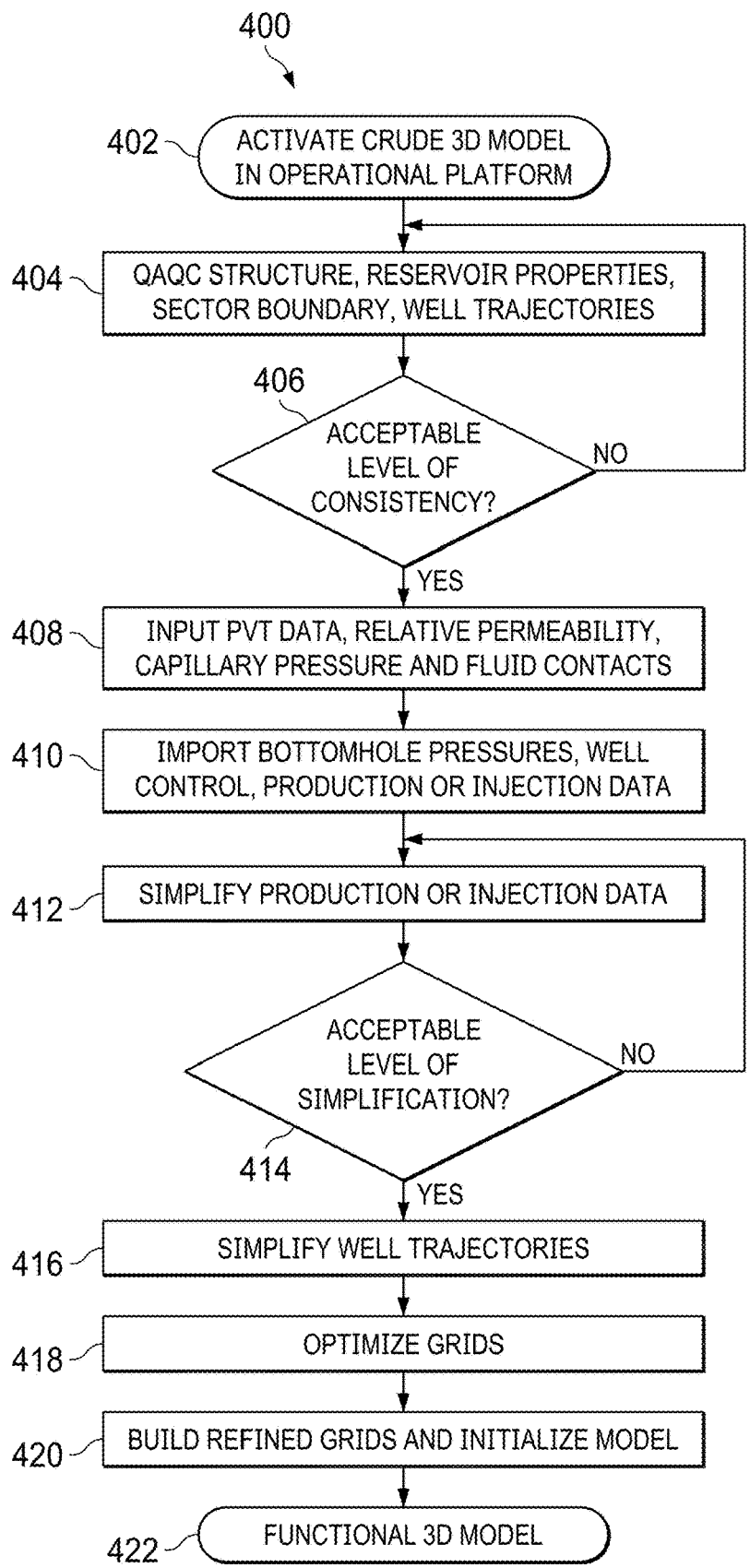
FIG. 4 is a flow chart illustrating an example of a workflow for building a functional 3D model from a crude 3D model, according to some implementations of the present disclosure.

FIG. 4 is a flow chart illustrating an example of a workflow 400 for building a functional 3D model from a crude 3D model, according to some implementations of the present disclosure. Process B, represented by the workflow 400, can be used for building a functional 3D model from the crude 3D model 226.

The workflow 400 can help in assuring that any simplifications on well trajectories or production/injection data performed in Process C do not change the characteristics and features of the original geological model. Such assurance can come from a comparison of model pressures of the functional 3D model with those of the crude 3D model. The main elements of Process B include the following.

QAQC Crude 3D Model

At 402, a crude 3D model is activated in an operatonal platform. At 404, a quality assurance and quality control (QAQC) structure, reservoir properties, sector boundary, and well trajectories are created from the model. For example, the functional 3D model received after transferring into the operational platform is subject to QAQC before starting the analysis of the pressure transient data. The step is needed because moving a model from one application to another can cause some inconsistency.

At 406, a determination is made whether an acceptable level of consistency exists in the structure, reservoir properties, model boundary, and well trajectories of the crude 3D model. If an acceptable level of consistency does not exist, then step 404 is repeated. Otherwise step 408 occurs.

In some implementations, determining whether an acceptable level of consistency exists includes the following. A modeler can perform the following three checks on the crude 3D model. A first check involves the boundary of the sector 3D model. All the trajectory points of the boundary of the model can be captured during the transfer. A second check can be associated with well perforations, since the perforations might not be synchronized correctly in some wells. Some of the perforations may stick out of the reservoir following the transfer. It is necessary to check all the perforations for each well moved to 3D transient model to correct any inconsistencies. A third check can be associated with structure. The QAQC can be accomplished by studying a number of cross sections out of the crude 3D model. The cross sections can be compared to the static model to make sure no discrepancies or anomalies exist in the structure. If the checks that are performed identify discrepancies between the crude 3D model and the static model, then the modeler can return to the static model to re-create the crude 3D model, rectifying the problem.

PVT and Relative Permeability Data and Fluid Contacts

At 408, PVT data, relative permeability, capillary pressure, and fluid contacts are input. For example, in building the 3D transient model, PVT and special core analysis (SCAL) data have to be incorporated in the model. The free-water level and contacts from the geological model can also be honored.

Pressure and Production/Injection Data

At 410, bottomhole pressures, well control data, and production data (or injection data) is imported. The imported data is needed for the ultimate product, an advanced 3D transient model, a dynamic model requiring integrating the production and injection data of all the wells. The workflow 400 is suitable for wells that are equipped with permanent downhole and surface pressure sensors and flowmeters. Such wells have continuous and high-resolution measurements of pressures and production rates obtained from each well. Each change in production or injection rate in the data of a well produces additional time steps, burdening the functional 3D model to generate additional simulated-pressure responses. Even slight variations in rates can cause the model to be run for unnecessary, additional computations. Therefore, simplification and denoising processes need to be performed on production-rate or injection-rate data, which is crucial to reduce the running time of the model, and to make the process more efficient. However, the simplification of rates has to be dictated by the significant changes in the corresponding bottom-hole pressures of the respective well. At 412, the production data (or the injection data) is simplified. At 414, a determination is made whether an acceptable level of simplification exists. If an acceptable level of simplification does not exist, further simplification is performed at step 412. Otherwise, at 416, well trajectories are simplified.

Figure 5A:
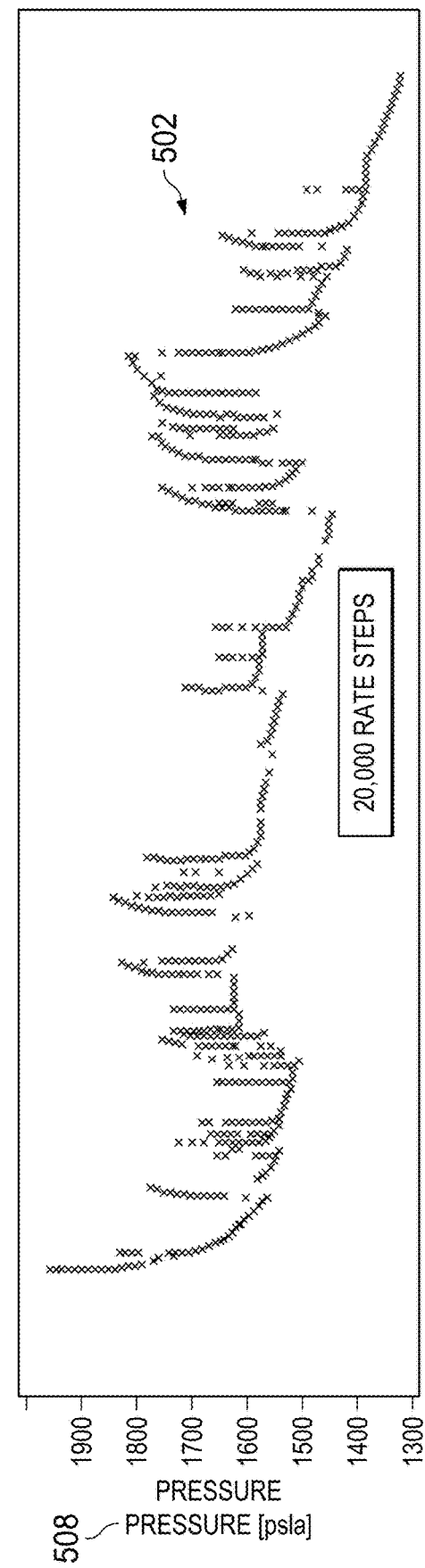
FIGS. 5A and 5B are graphs collectively illustrating an example of a reduction in a number of rate steps resulting in a lower computational load, according to some implementations of the present disclosure.
Figure 5A:
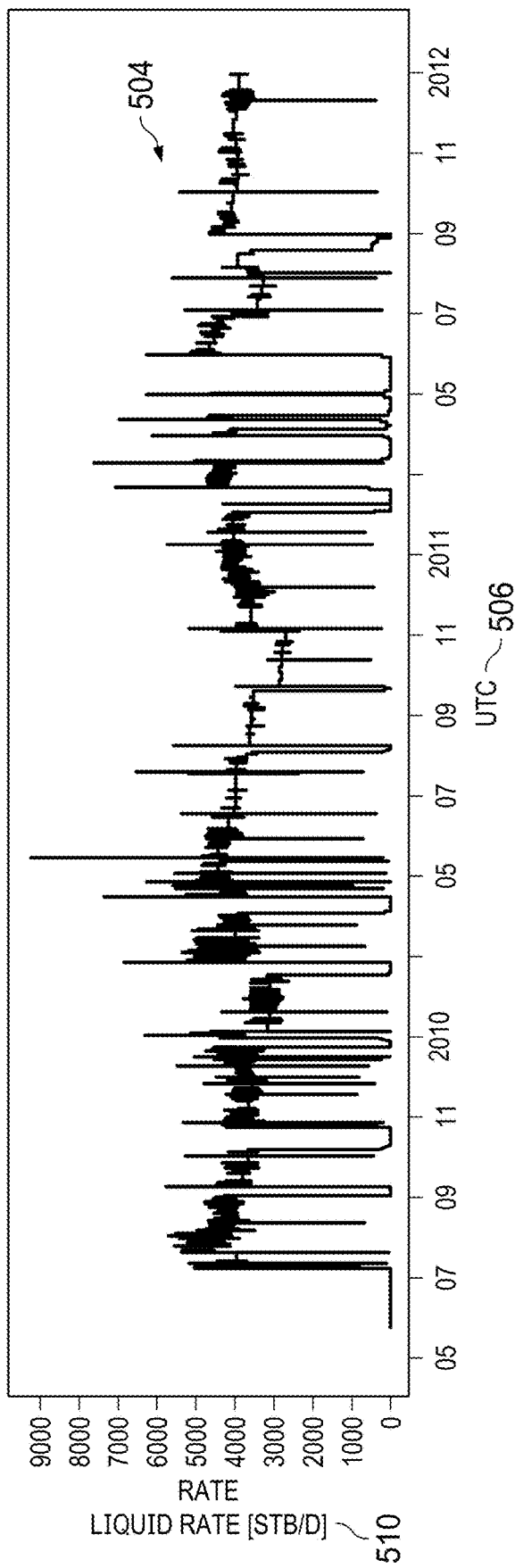
Figure 5B:
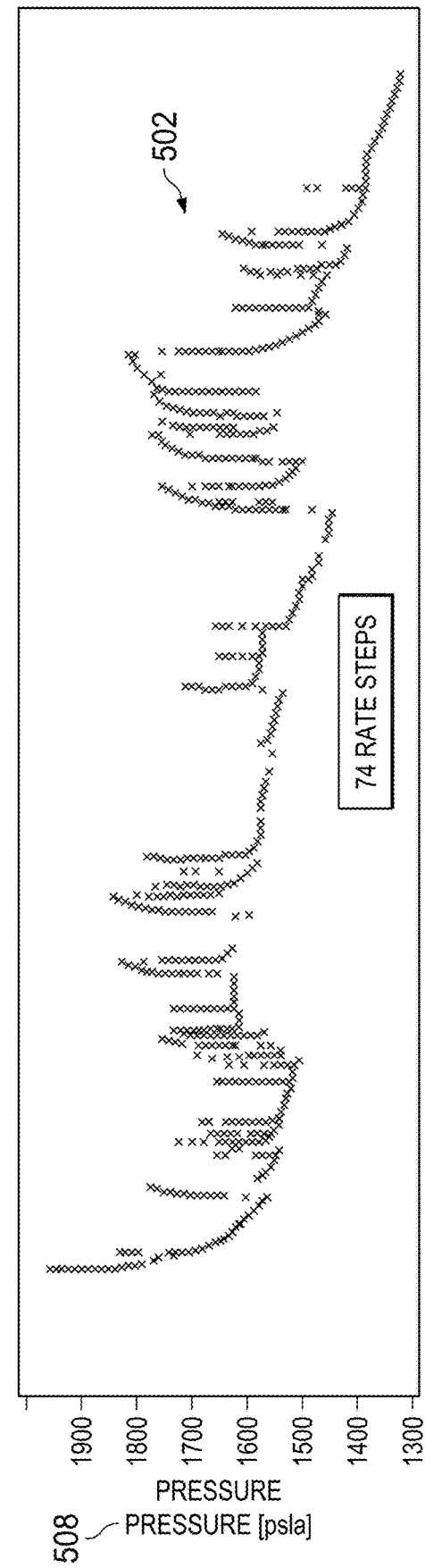
Figure 5B:
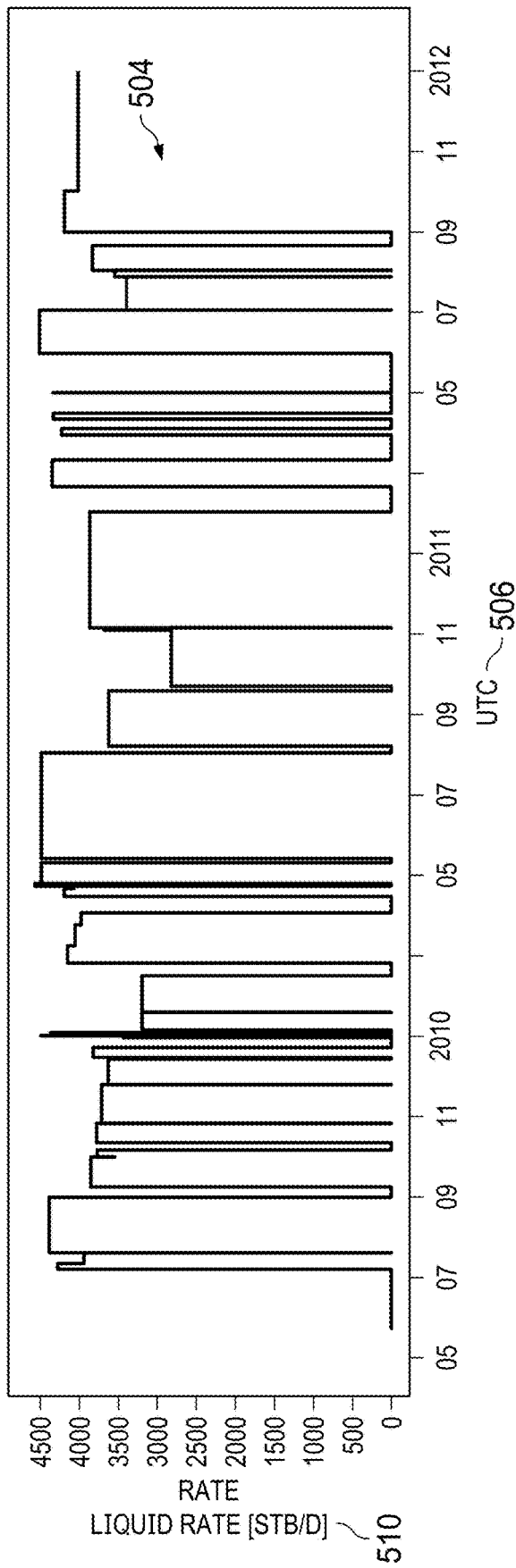

FIGS. 5A and 5B are graphs collectively illustrating an example of a reduction in a number of rate steps resulting from a lower computational load, according to some implementations of the present disclosure. For example, graph 550 of FIG. 5B illustrates a reduction in a number of rate steps (for example, 74) in production data for a lower computational load, as compared to graph 500 of FIG. 5A (for example, 20,000 rate steps). The rate steps reduction is shown in a pressure plot 502, plotted relative to time 506 (for example, in Coordinated Universal Time (UTC)) and pressure 508 (for example, in pounds per square inch absolute (psia)). The rate steps reduction is further shown in a pressure plot 504, plotted relative to time 506 and liquid rate 510 (for example, in stock tank barrels per day (stb/d)).

Optimizing Running Time

Optimization of the running time is to be executed. This is because the functional 3D transient model requires refined, unstructured Voronoi grids that are essential to accurately capture the pressure-transient behavior around the well into the reservoir. In addition, optimization simplifies the execution of the 3D models that are run on personal workstations, since the size of model in terms of the computational load can remain manageable. The desired optimization can be achieved by the following steps.

Grids Optimization

At 418, grids are optimized. The unstructured Voronoi grids allow for local grid refinements around the wells. The grid settings should be selected in an efficient way in order to reduce the running time and help achieving the objective of matching the pressure transient data. For matching the pressure derivative data obtained from a build-up period of a specific well, a very refined-grid setting is selected for that subject well to allow the model to capture all flow regimes of the pressure-transient behavior. On the other hand, matching the bottom-hole pressure of one year or two years of that well can require less grid refinement.

Well Simplification

At 420, refined grids are built from the optimized grids, and the model is initialized, producing a functional 3D model 422. The actual trajectories of horizontal wells are not truly horizontal within the reservoirs completed over time. Instead, the trajectories follow snaky paths to maximize connectivity with the reservoir. Such complex trajectories require refined grids along the horizontal section. Unless a given horizontal section of the well is penetrating different zones with significant change in properties, the trajectory can be simplified. Simplification can be used in this way when the simplification does not change the dynamic behavior of the well or the pressure transient data. In most cases, horizontal wells target one layer, allowing their trajectory within that layer to be simplified. This simplification can significantly reduce the number of grids along horizontal sections. As a result of simplification, the computational load decreases substantially, which cuts down the running time of the model through well simplification. Some experiments have shown that the running time can be decreased by as much as 80% for a 50% reduction in the numbers of grids in a sector model following well simplification.

Figure 6A:
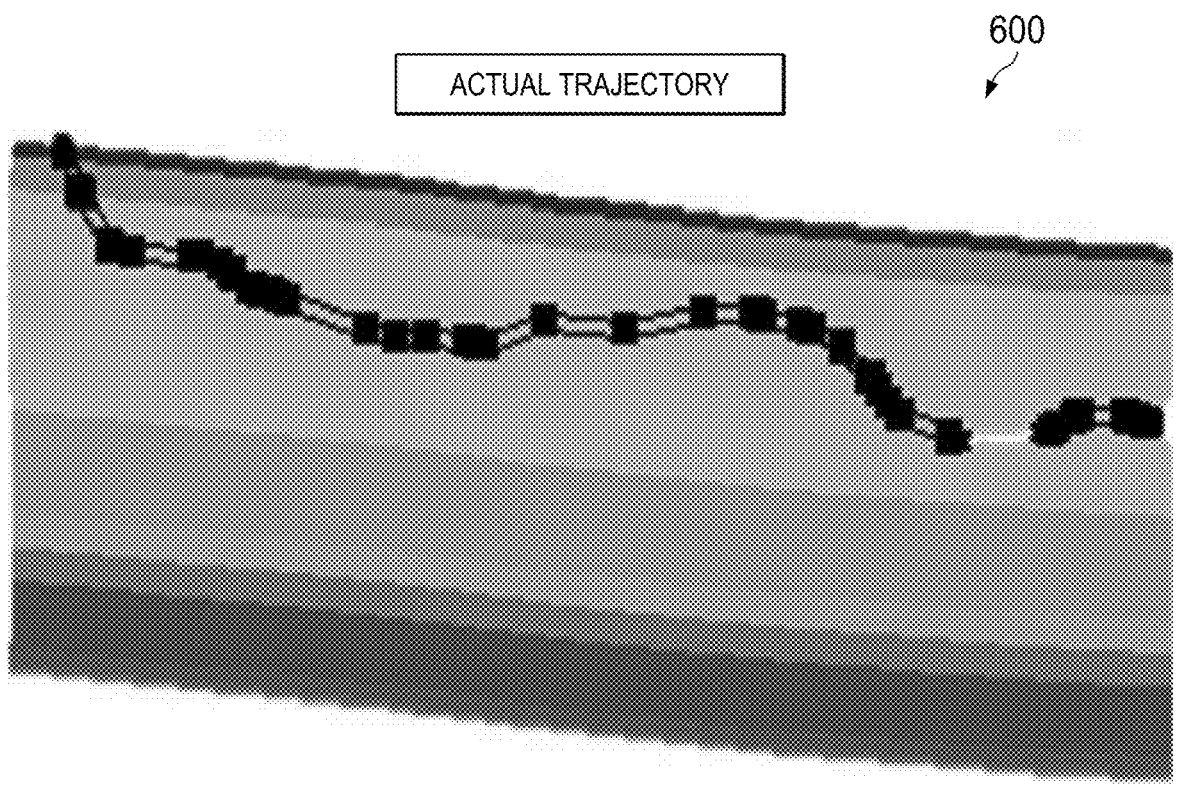
FIGS. 6A and 6B are plots showing examples of actual and simplified trajectories associated with a simplification of an actual well trajectory, according to some implementations of the present disclosure.
Figure 6B:
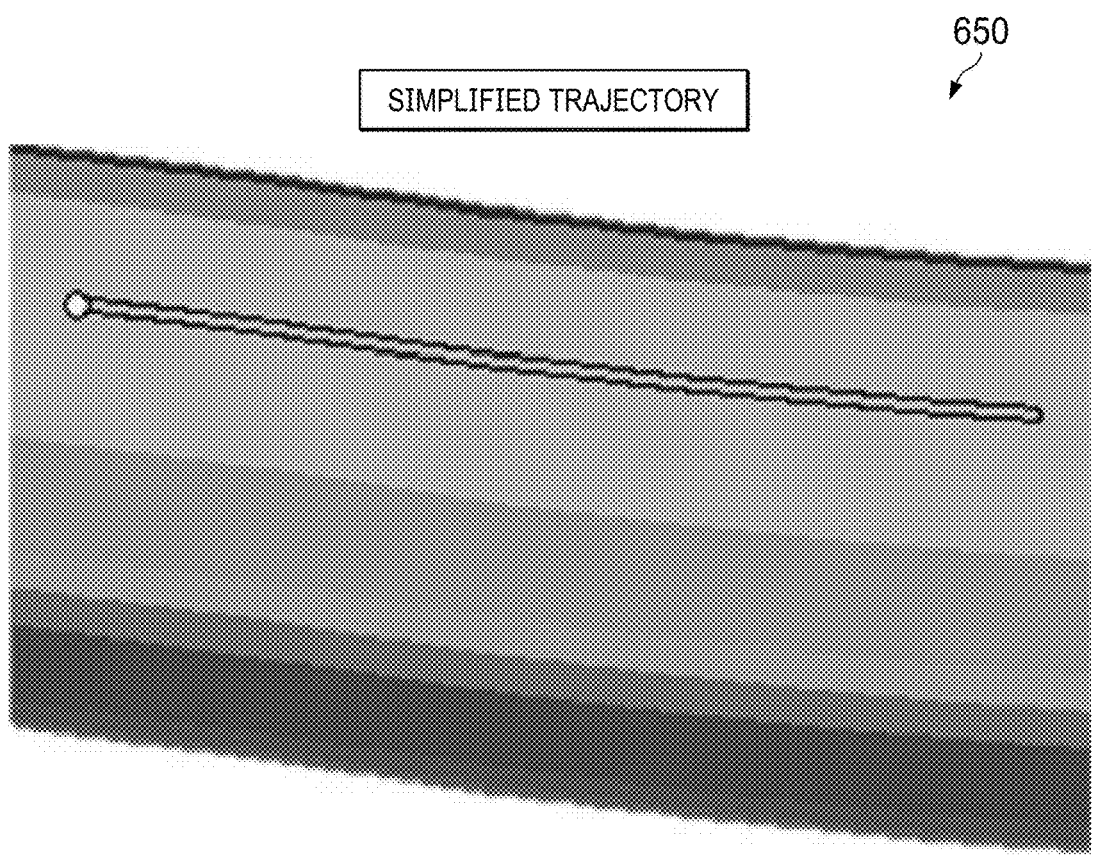

FIGS. 6A and 6B are plots showing examples of actual and simplified trajectories associated with a simplification of an actual well trajectory, according to some implementations of the present disclosure. FIG. 6A shows an actual trajectory 600. FIG. 6B shows a simplified trajectory 650 resulting from a simplification process used on a complex well trajectory.

Process C—Single-Well Pressure Transient Matching

Figure 7:
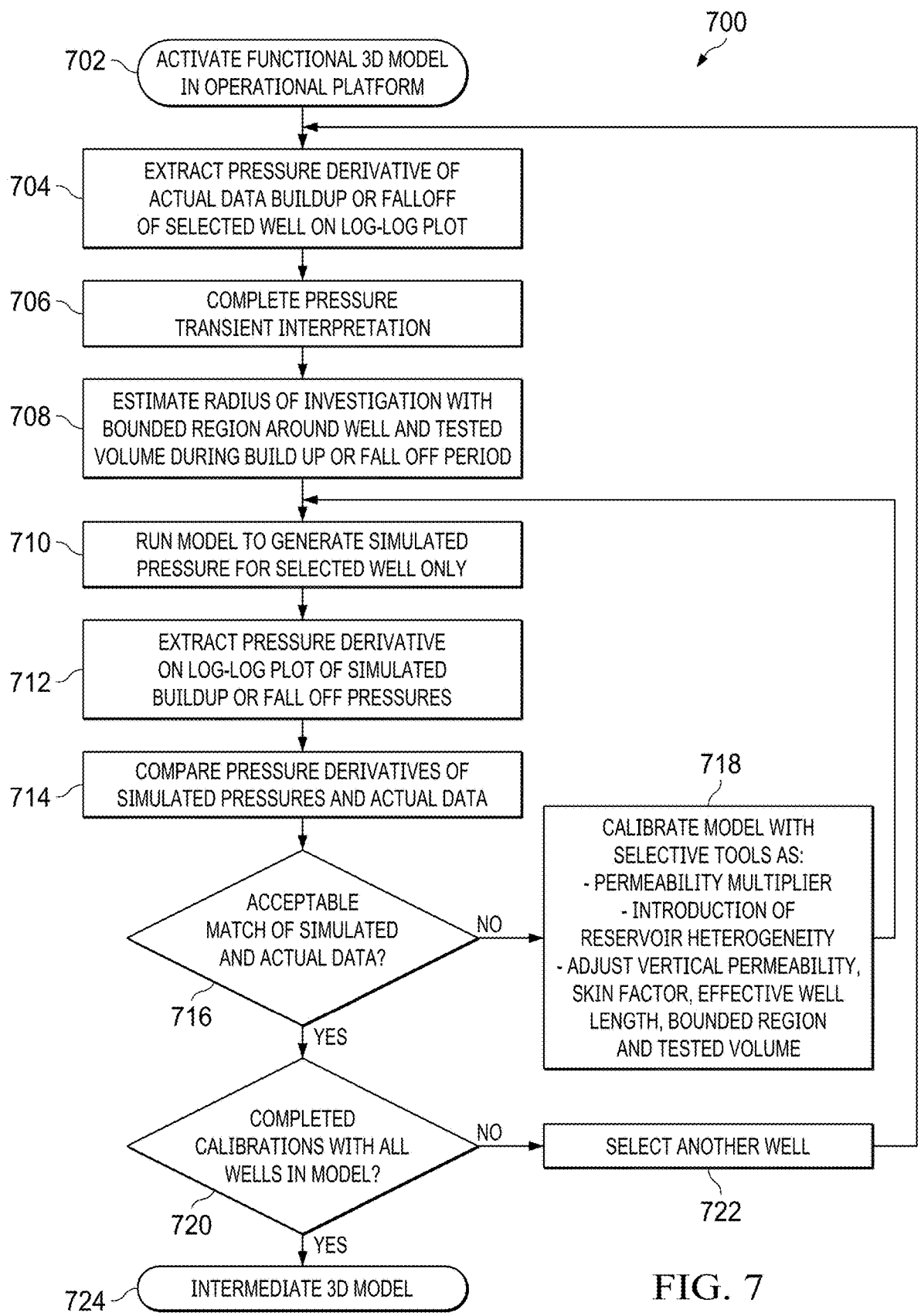
FIG. 7 is a flow chart illustrating an example of a workflow for building an intermediate 3D model from a functional 3D model, according to some implementations of the present disclosure.

FIG. 7 is a flow chart illustrating an example of a workflow 700 for building an intermediate 3D model from a functional 3D model, according to some implementations of the present disclosure. Process C, represented by the workflow 700, can be used for building an intermediate 3D model from a functional 3D model.

An objective of Process C is to integrate the results of a pressure-transient analysis for the producers and injectors, and to incorporate the results in a 3D transient model. This process involves performing a model matching the pressure derivative of all buildup and falloff data of the subject wells in the 3D transient model. The primary focus of Process C is to calibrate the functional 3D model so that a match between the model and the measured pressures are obtained on a single-well basis. The significance of this process includes considering one well at a time, for all the wells in the sector model. Main elements of Process C include the following.

At 702, a functional 3D model is activated in the operational platform. At 704, after running the functional 3D model initially, pressure derivatives of actual data or buildup or falloff of selected wells are extracted from log-log plots. At 706, pressure transient interpretation is completed. At 708, a radius of investigation with a bounded region around a well is estimated, and the volume during a buildup or falloff period is tested. At 710, the model is run to generate simulated pressured for a selected well only. At 712, pressure derivatives are extracted on a log-log plot of simulated buildup or falloff pressures. At 714, the derivatives of simulated pressure responses obtained from the model are compared to those of measured pressure data.

At 716, a determination is made whether an acceptable match exists between the simulated data and the actual data. If an acceptable match does not exist, then at 718, the model is calibrated with selective tools. For example, the tools can include a permeability multiplier, an introduction of reservoir heterogeneity, and an adjustment of one or more of a vertical permeability, skin factor, effective well length, bounded region, and tested volume. The model can then be rerun at step 710.

If an acceptable match exists at 716, then a determination is made at 720 whether all well calibrations have been completed. If not, then another well is selected at 722, and processing for the well begins at step 704. If all wells have been processed, the intermediate 3D model is complete at 724.

Since the static permeability is expected to be different from the dynamic permeability (md), there may be differences between the magnitude of flow capacity kh obtained from pressure-transient analysis and the magnitude of kh obtained from the simulated pressure of the 3D transient model. In this case, it is necessary to condition the permeability in the model to the pressure-transient permeability. It is very important also to incorporate the effective well lengths and the skin values obtained from the pressure transient analysis. These parameters also have a significant impact on the dynamic performance of the model and the long bottom-hole pressure response of the wells. In some implementations, kh can be measured using a permeability-thickness product, for example, md-ft (feet), where h is a pay thickness in feet, and k is permeability in the horizontal direction.

Figure 8A:
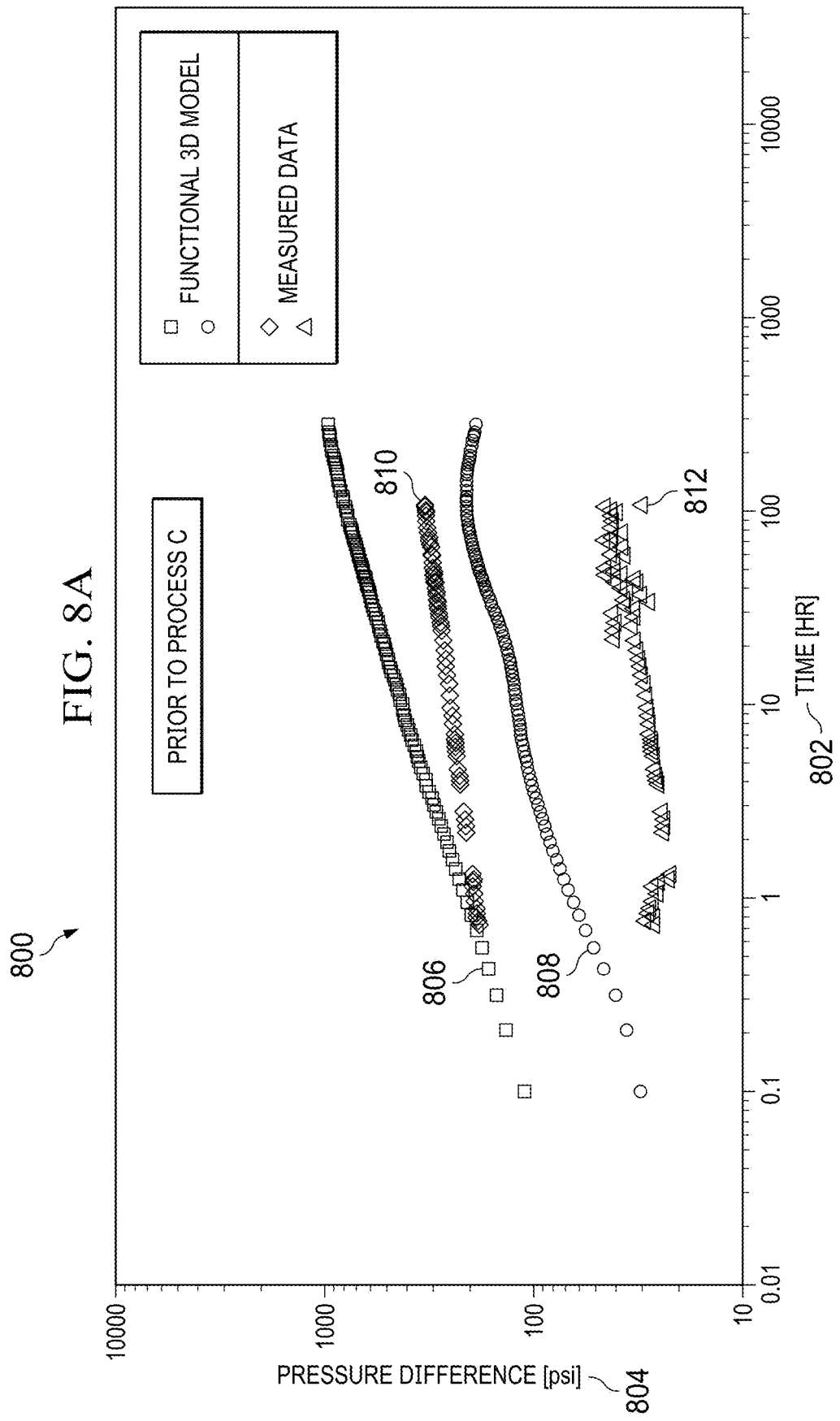
FIGS. 8A and 8B are graphs showing examples of comparisons of log-log plots, according to some implementations of the present disclosure.
Figure 8B:
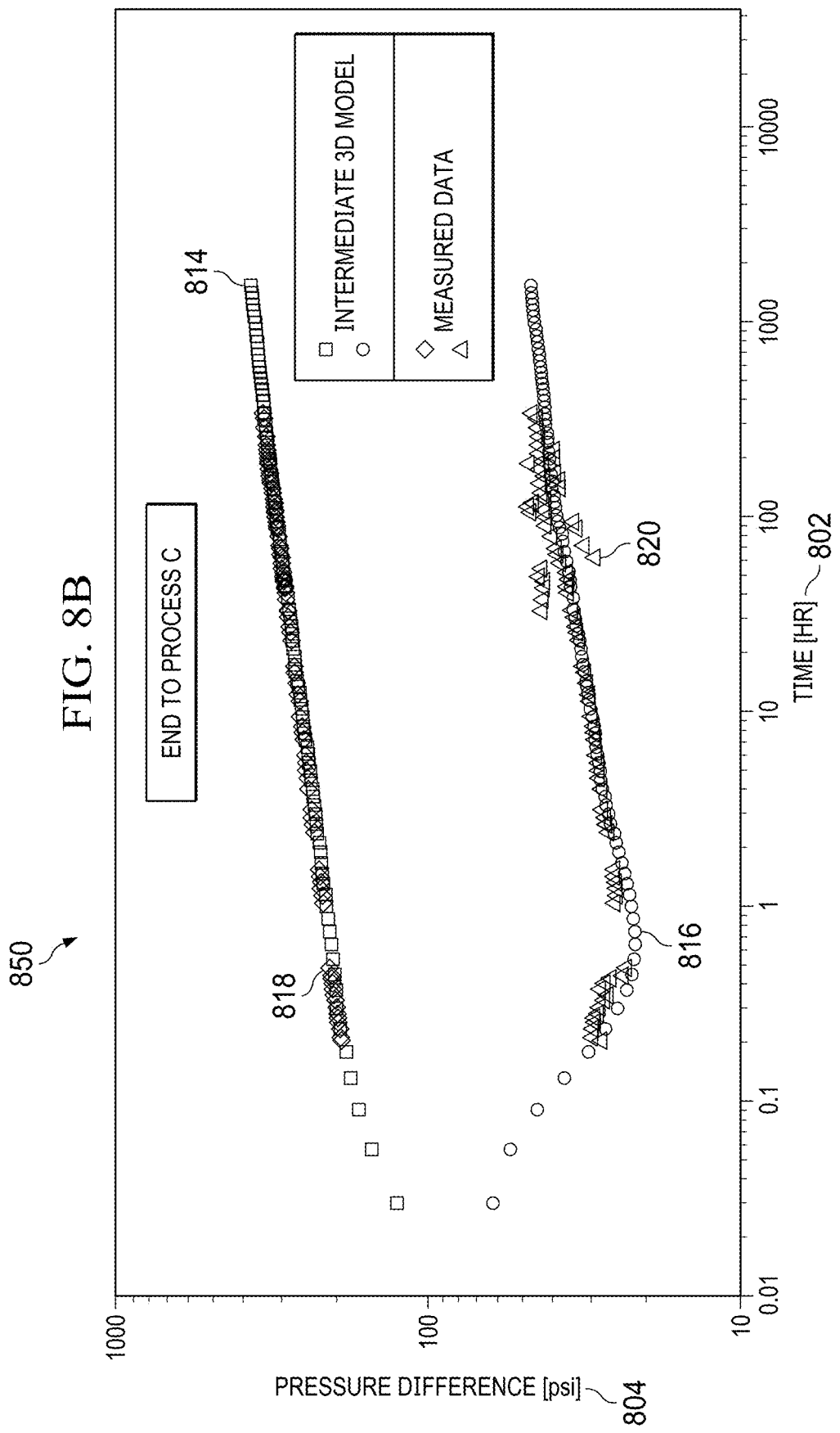

FIGS. 8A and 8B are graphs showing examples of comparisons of log-log plots, according to some implementations of the present disclosure. The log-log plots are plots of simulated pressures of the functional 3D model prior to completion of Process C and of those after completion of Process C, resulting in the corresponding intermediate 3D model with the measured data in a particular well. Graph 800 in FIG. 8A shows the mismatch of the simulated pressures and the measured pressures prior to completion of Process C on a particular well (Well G). Graph 850 in FIG. 8B shows the final match of the simulated pressures and the measured pressures after completion of Process C on the log-log plots. Completion of Process C, resulting in an intermediate 3D model following such matching, is done for all the wells successively. Graphs 800 and 850 include plots plotted relative to time 802 (for example, in hours (hr)) and pressure 804 (for example, in pounds per square inch (psi)).

The plots in FIG. 8A include functional 3D model plots 806 and 808, and measured data plots 810 and 812. The plots in FIG. 8B include intermediate 3D model plots 814 and 816, and measured data plots 818 and 820.

The permeability obtained from the pressure-transient analysis is valid within the radius of investigation during the build-up period. Beyond that radius, the permeability from pressure transient data is unknown. Therefore, conditioning the permeability in the model should be performed only within that radius, which is performed in this workflow by creating a composite region around the subject well. The permeability within that region can be calibrated by applying multipliers on the permeability of the model to match the pressure-transient permeability. In some cases, there can be more than one scenario that could match the pressure derivative of single wells. Particularly, such cases can include horizontal wells where the contributed thickness might be unknown from the pressure derivative response. These scenarios can be evaluated during the last step of this workflow, which is the multi-well transient match. Long bottom-hole pressure trends of the wells can be matched during the multi-well matching process, and the most likely scenario can be distinguished by providing the best match.

The single-well transient matching process can be completed by matching derivatives of the simulated pressures with those of the measured pressure during all buildup and falloff periods in the history of the each well, individually. This process can result in regions that calibrate the permeability around all wells to match the magnitude of kh, as determined from the pressure-transient analysis. In addition, the skin factors and the effective well lengths obtained from the pressure transient analysis can be incorporated. These regions essentially represent the radii of investigation reached during the respective buildup or falloff tests.

Process D—Multi-Well Pressure Transient Matching

Figure 9:
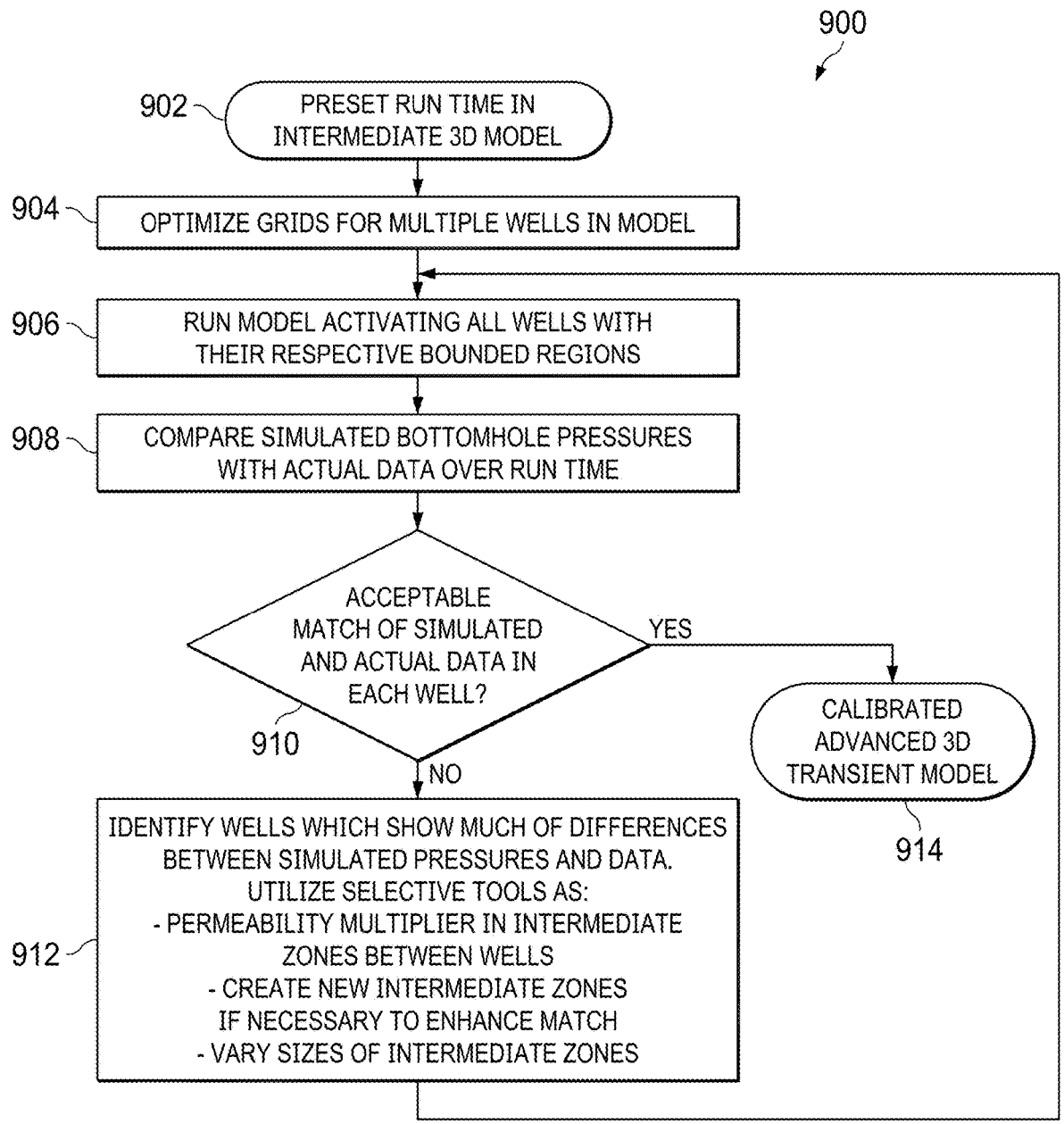
FIG. 9 is a flow chart illustrating an example workflow for building a calibrated advanced 3D transient model from an intermediate 3D model, according to some implementations of the present disclosure.

FIG. 9 is a flow chart illustrating an example workflow 900 for building a calibrated advanced 3D transient model from an intermediate 3D model, according to some implementations of the present disclosure. Process D, represented by the workflow 900, can be used for building the final product of the workflow presented in the present disclosure.

In contrast to Process C, Process D involves simultaneous use of data from multiple wells to make sure that historical data of bottom-hole pressures in all these wells are matched. Objectives that are accomplished can include: validating the single-well matching performed earlier for each well, calibrating intermediate zones that were left out during the single-well matching, and describing (with confidence) the entire sector in terms of permeability. Principal elements of Process D are discussed in the following.

Run Time

At 902, a run time is pre-set in the intermediate 3D model. Determination of the optimum run time is often an iterative process because this involves a number of considerations. Typically, the run time can vary from six months to two years depending on the permeability and the areal size of the sector model, and the historical behaviors of the wells included in the model. Available history of bottom-hole pressures and injection/production rates in each well also dictate the run time. Reservoir heterogeneity in both areal and vertical extents can affect how long the model has to run. This period should be long enough to let the wells interfere with each other. The signs of such interference should be evident in the pressure data. However, the run time should not be so long that the pressure transient can be affected by the boundaries of the sector model, which may distort the simulated pressure behavior discriminately.

At 904, grids are optimized for multiple wells in the model. At 906, the model is run, activating all wells with their respective bounding regions. At 908, simulated bottomhole pressures are compared with actual data for the run time. At 910, a determination is made whether an acceptable match exists between the simulated data and the actual data for each well.

If an acceptable match does not exist, then at 912, wells are identified which show much of the differences between the simulated pressures and the data. Tools that can be used to accomplish this include one or more of using a permeability multiplier in intermediate zones between wells, creating new intermediate zones if necessary to enhance matching, and varying sizes of intermediate zones. If an acceptable match exists at 910, then at 914 the calibrated advanced 3D transient model is complete.

Calibration of Intermediate Zones

Process D is particularly essential to calibrate the reservoir areas left out by the previous process (single-well transient matching in Process C). This also enables capturing reservoir heterogeneity between wells or the pressure support obtained from injectors towards producers. The impact of any heterogeneity beyond the radius of investigation as determined from the respective buildup or falloff test is only captured in multi-well pressure transient matching. More area coverage for permeability calibration of the sector will be accomplished during the multi-well pressure transient matching. The regions around the wells are subject to enlargement, extension or annexation of additional regions between the neighboring wells to match the long-term pressure performance of each well in the model.

Figure 10B:
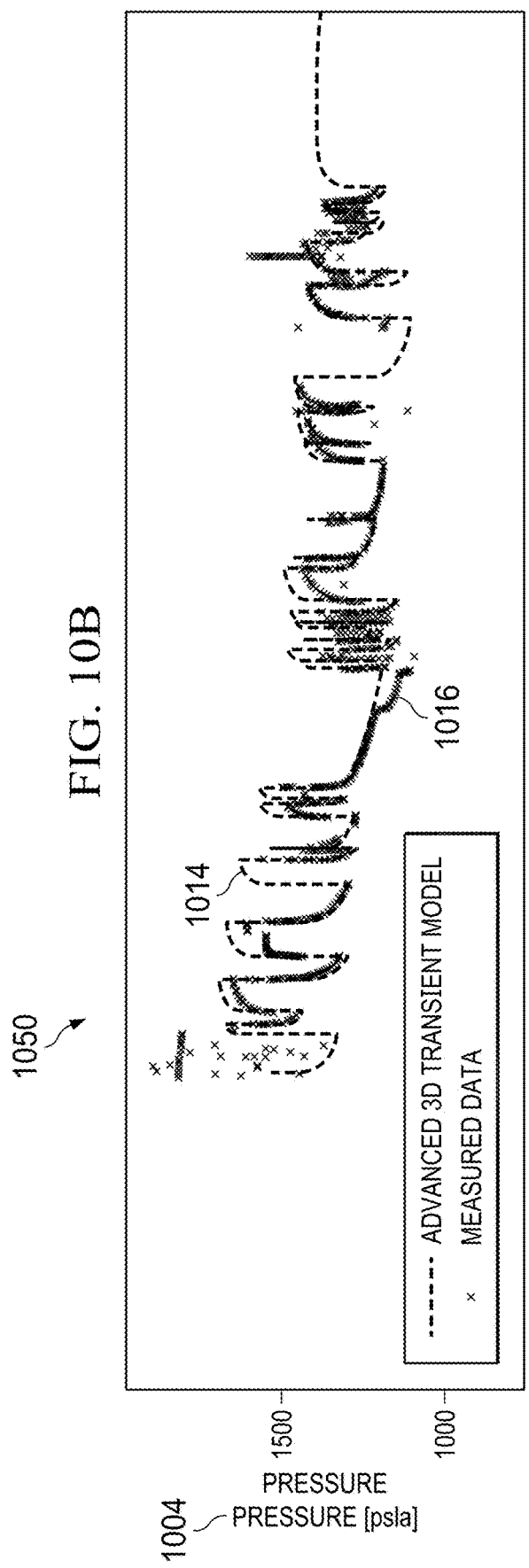
Figure 10B:
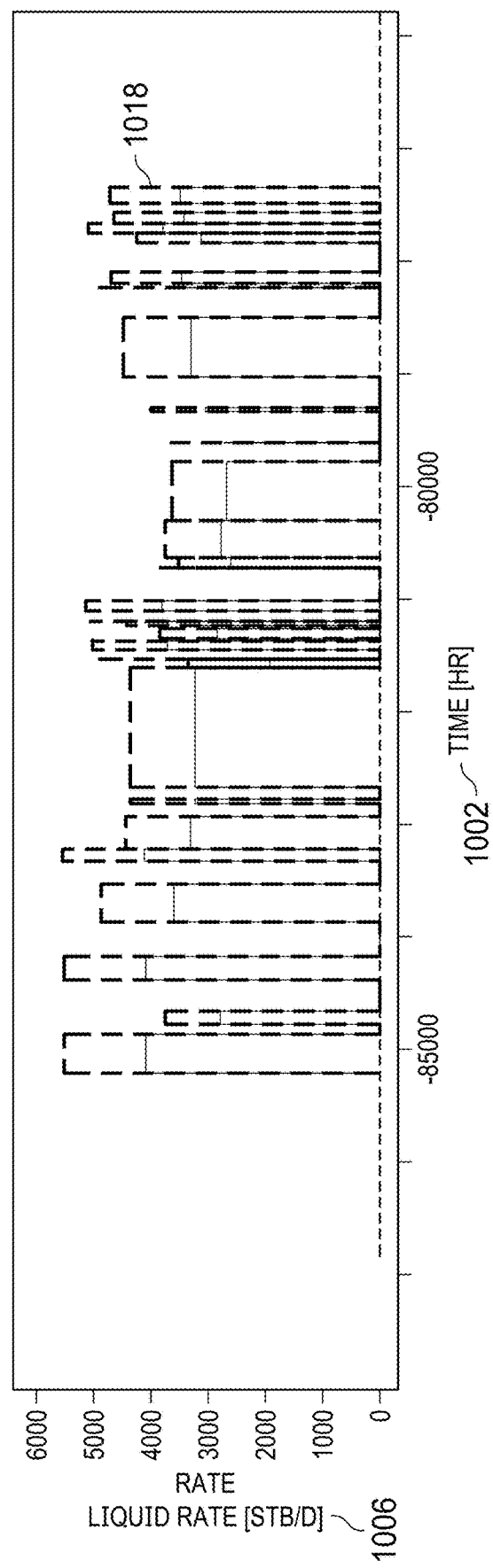

FIGS. 10A and 10B are graphs showing examples of comparisons of the history plots, according to some implementations of the present disclosure. For example, comparison plots 1000 and 1050 are associated with simulated pressures of the intermediate 3D model prior to completion of Process D and of those after completion of Process D, resulting in the advanced 3D transient model with the measured data in a particular well (for example, Well K). FIGS. 10A and 10B show the mismatch of the simulated pressures and the measured pressures prior to completion of Process D, and the final match of the simulated pressures and the measured pressures after completion of Process D in Well K on the history plots. Completion of Process D results in an advanced 3D transient model following such match is accomplished for all the wells in the model. Comparison plots 1000 and 1050 are plotted relative to time 1002, pressure 1004, and liquid rate 1006. The plots in FIG. 10A include intermediate 3D model plot 1008, measured data plot 1010, and liquid rate plot 1012. The plots in FIG. 10B include advanced 3D transient model plot 1014, measured data plot 1016, and liquid rate plot 1018.

FIGS. 11-15 provide examples of outputs of the Processes A, B, C, and D. For example, such results can be achieved with 12 wells in the sector model (including seven producers and five injectors).

Figure 11:
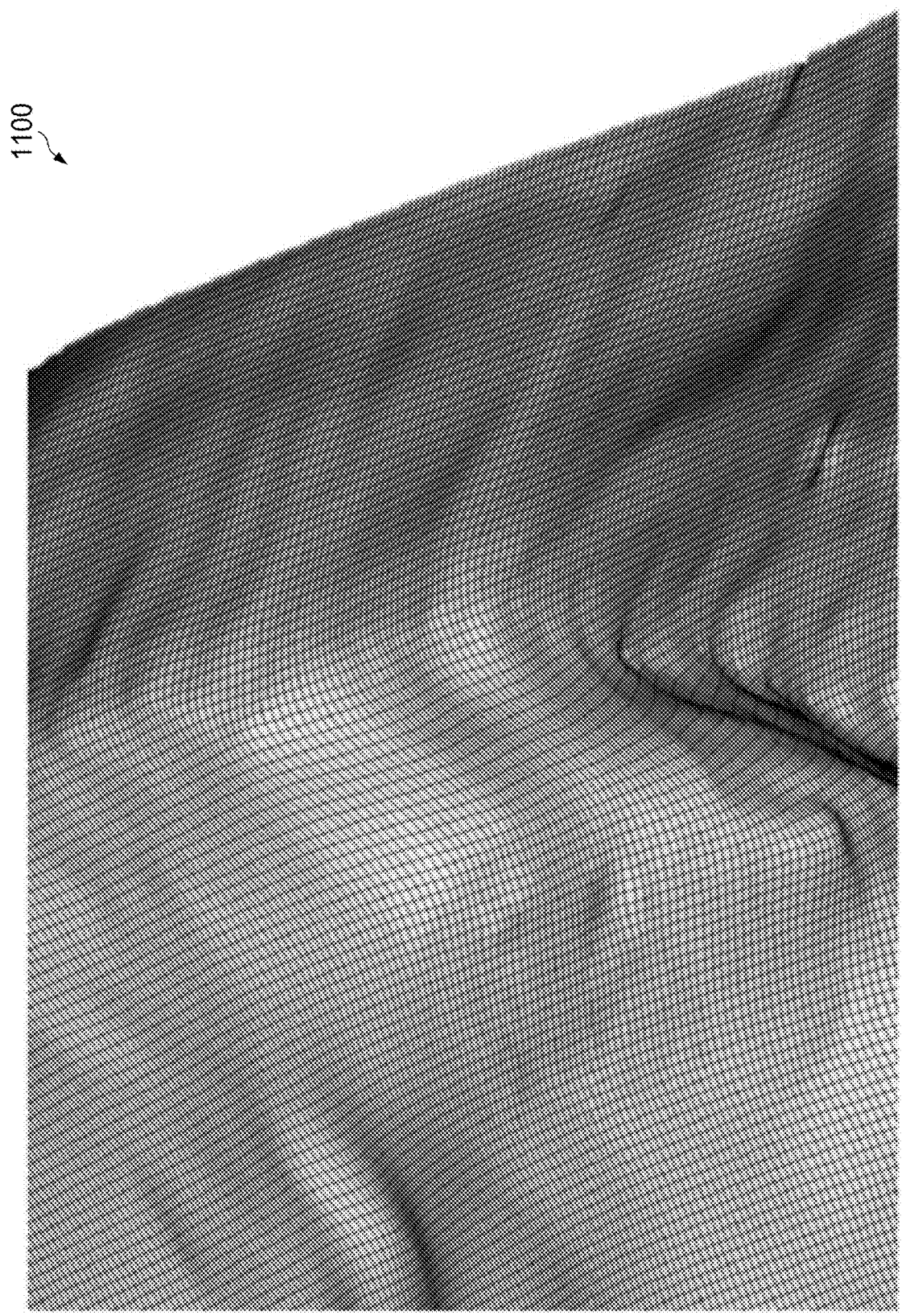
FIG. 11 is an illustration of a full-field geological model, according to some implementations of the present disclosure.

FIG. 11 is an illustration of grids 1100 of a full-field geological model, according to some implementations of the present disclosure. The plot 1100 can serve as the building block of an advanced 3D transient model (for example, serving as the input to the initial step of Process A).

Figure 12:
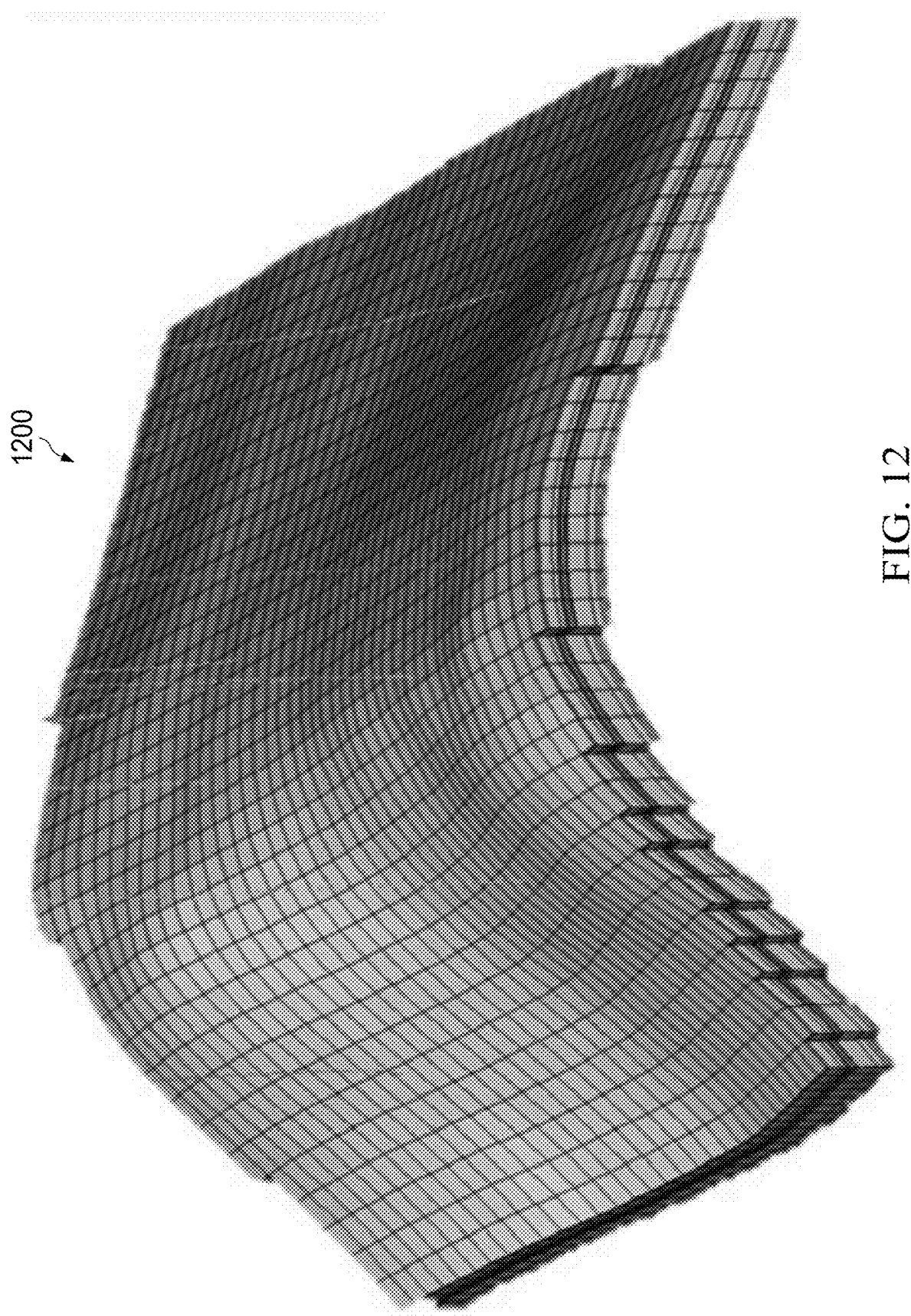
FIG. 12 is an illustration of a crude 3D model, according to some implementations of the present disclosure.

FIG. 12 is an illustration of grids 1200 of a crude 3D model, according to some implementations of the present disclosure. The plot 1200 can be associated, for example, with 12 wells including seven procuders and five injectors (for example, from the final step of Process A).

Figure 13:
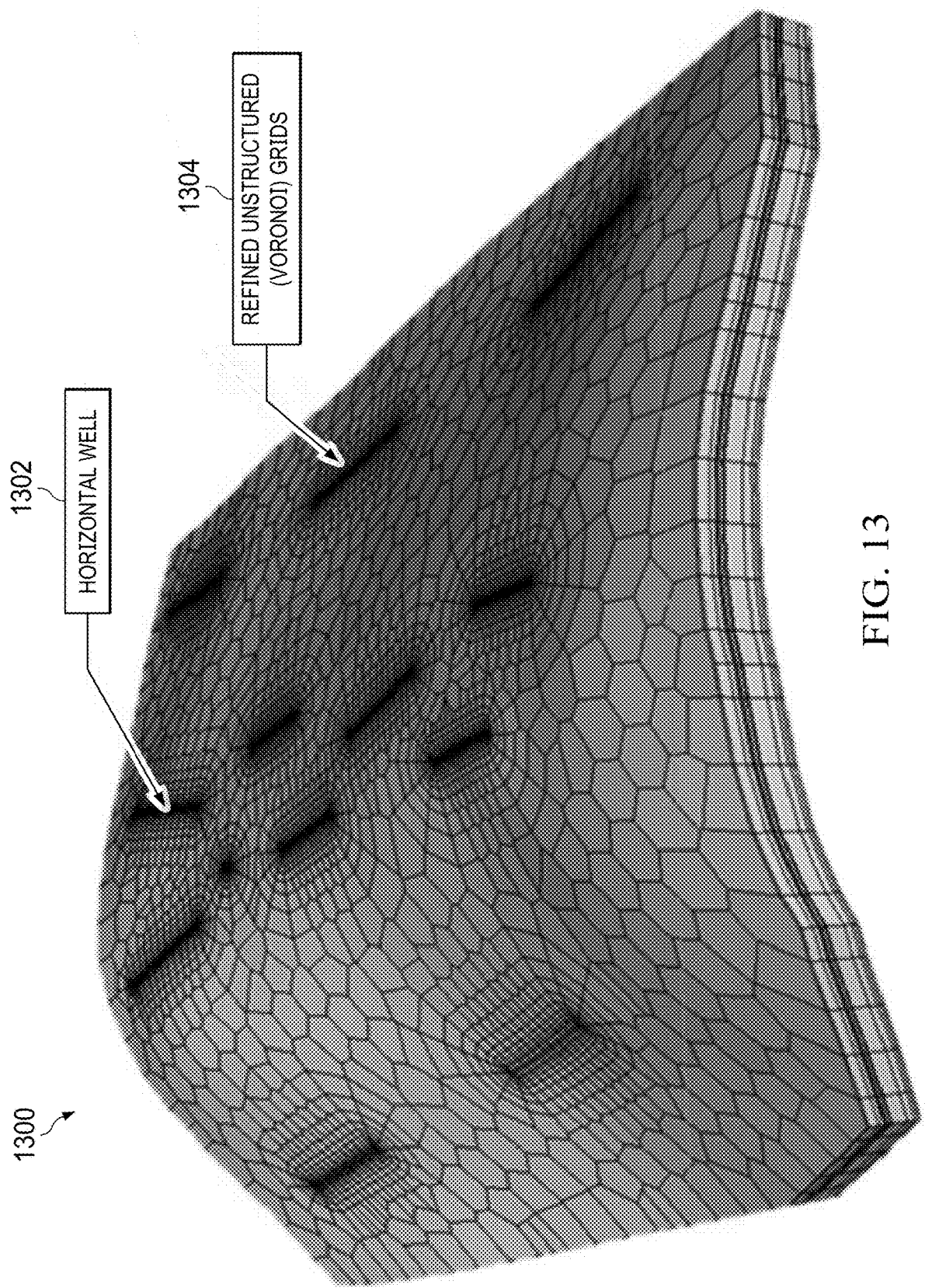
FIG. 13 is an illustration of a functional 3D model, according to some implementations of the present disclosure.

FIG. 13 is an illustration of grids and wells 1300 of a functional 3D model, according to some implementations of the present disclosure. The plot 1300 can be based on 90,255 grids (for example, from the final step of Process B). The plot 1300 shows locations of a horizontal well 1302 and refined, unstructured (Voronoi) grids 1304.

Figure 14:
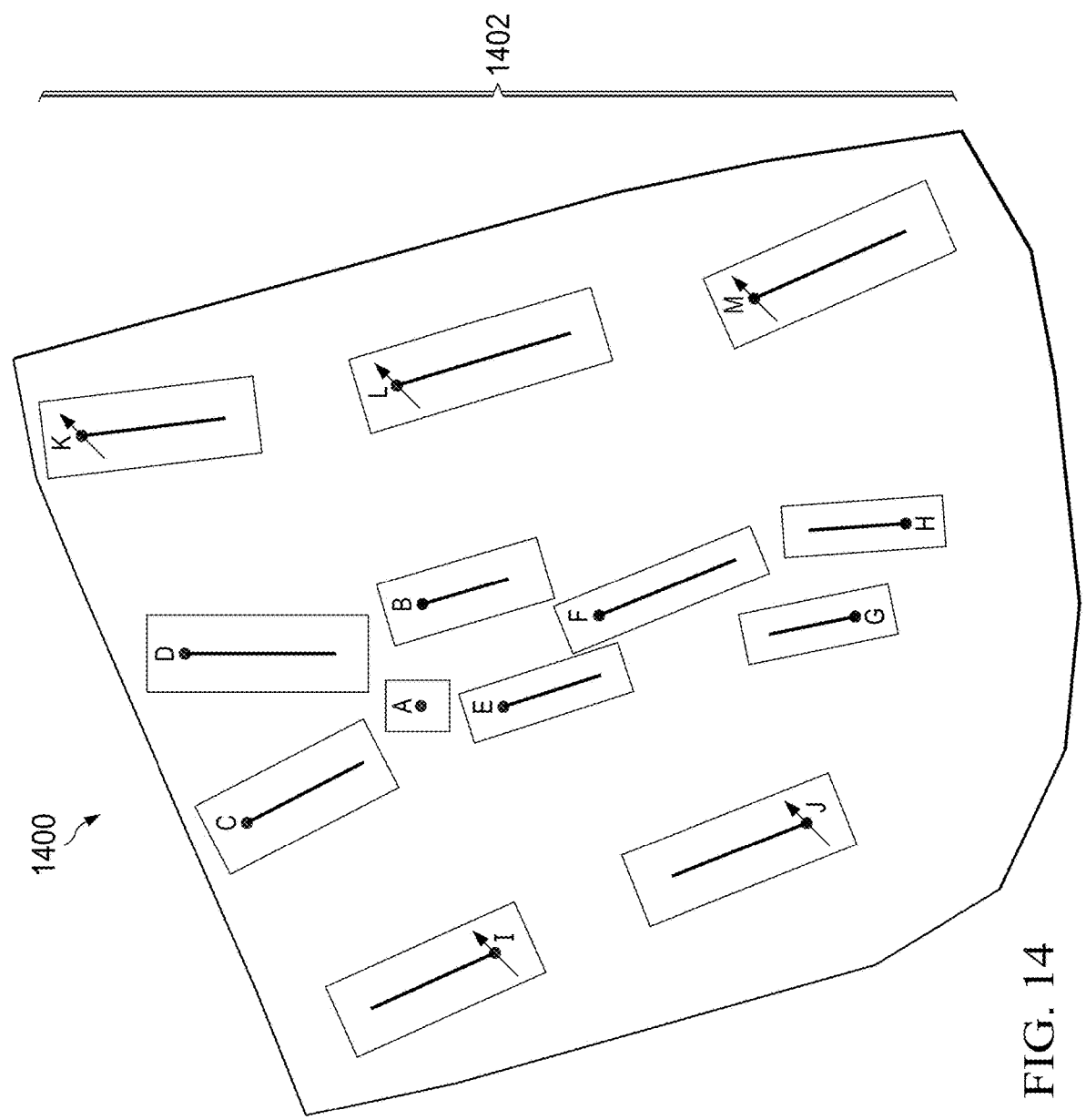
FIG. 14 is a plan view of an intermediate 3D model, according to some implementations of the present disclosure.

FIG. 14 is a plan view 1400 of an intermediate 3D model, according to some implementations of the present disclosure. The plan view 1400 includes assigned region of investation 1402 for each well (for example, from the final step of Process C).

Figure 15:
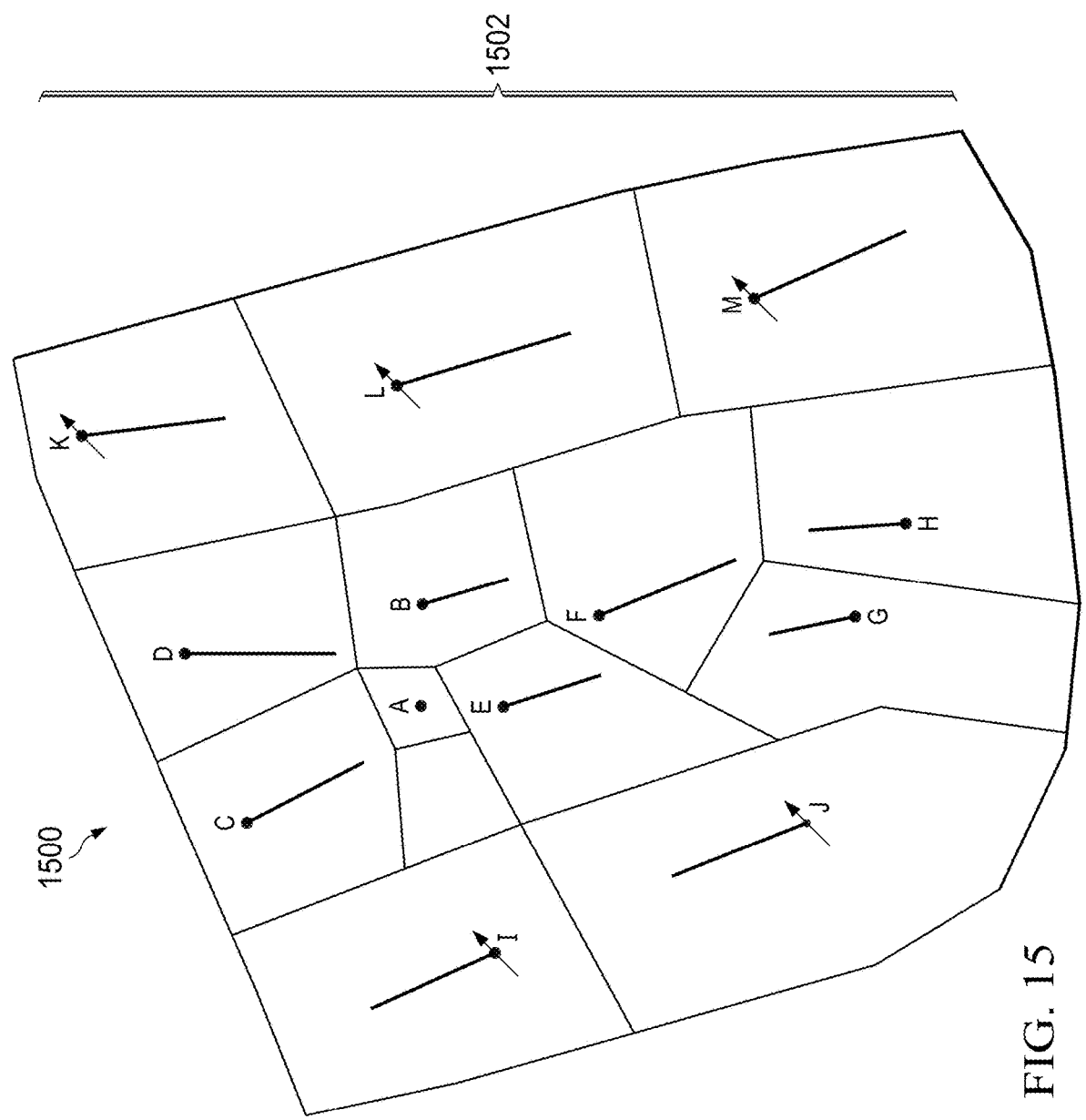
FIG. 15 is a plan view of a calibrated advanced 3D model, according to some implementations of the present disclosure.

FIG. 15 is a plan view 1500 of a calibrated advanced 3D model, according to some implementations of the present disclosure. The plan view 1500 includes new sizes and shapes of intermediate regions 1502.

Figure 16:
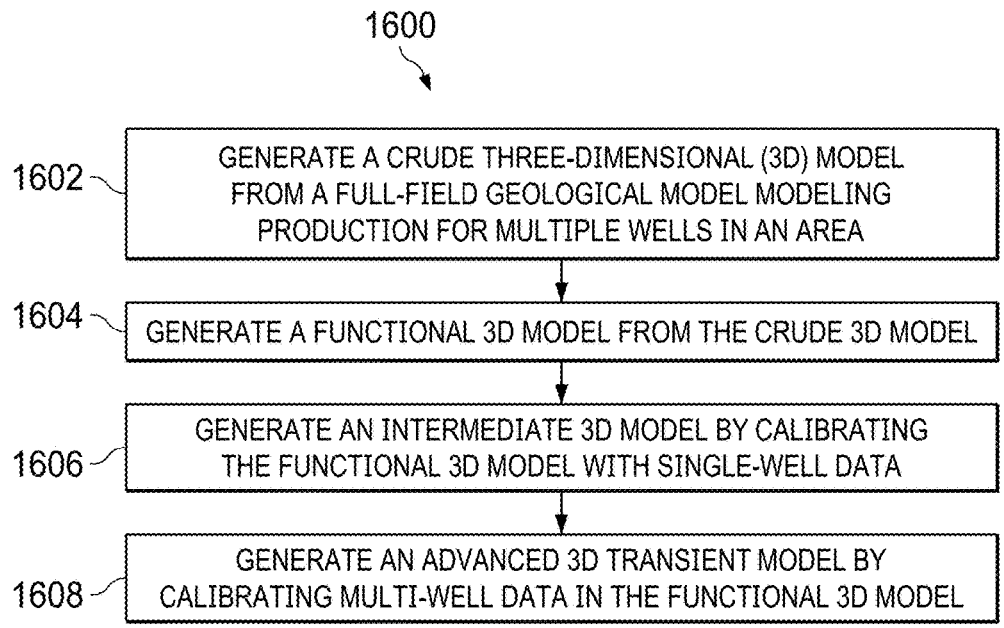
FIG. 16 is a flowchart of an example of a method for generating an advanced 3D model, according to some implementations of the present disclosure.

FIG. 16 is a flowchart of an example of a method 1600 for generating an advanced 3D model, according to some implementations of the present disclosure. For clarity of presentation, the description that follows generally describes method 1600 in the context of the other figures in this description. However, it will be understood that method 1600 can be performed, for example, by any suitable system, environment, software, and hardware, or a combination of systems, environments, software, and hardware, as appropriate. In some implementations, various steps of method 1600 can be run in parallel, in combination, in loops, or in any order.

At 1602, a crude 3D model is generated from a full-field geological model that models production for multiple wells in an area. As an example, a crude 3D model can be generated as described with reference to FIG. 2. In some implementations, generating the functional 3D model from the crude 3D model can include: activating the crude 3D model in an operatonal platform; generating a quality assurance and quality control (QAQC) structure, reservoir properties, a sector boundary, and well trajectories from the crude 3D model; determinating that an acceptable level of consistency exists in the QAQC structure, the reservoir properties, the sector boundary, and the well trajectories; receiving pressure, volume, and temperature (PVT) data, relative permeability, capillary pressure, and fluid contacts for the crude 3D model; importing bottomhole pressures, well control data, and production data for the crude 3D model; simplifying production data for the crude 3D model; determining that an acceptable level of simplification exists in the crude 3D model; simplifying well trajectories for the crude 3D model; optimizing grids for the crude 3D model; generating refined grids from the optimized grids; and producing a functional 3D model using the refined grids. From 1602, method 1600 proceeds to 1604.

At 1604, a functional 3D model is generated from the crude 3D model. For example, a functional 3D model can be generated as described with reference to FIG. 4. Generating the functional 3D model from the crude 3D model can include simplifying the functional 3D model to reduce a number of grids along horizontal sections of the functional 3D model. In some implementations, generating the functional 3D model from the crude 3D model can include: activating the crude 3D model in an operatonal platform; generating a QAQC structure, reservoir properties, a sector boundary, and well trajectories from the crude 3D model; determinating that an acceptable level of consistency exists in the QAQC structure, the reservoir properties, the sector boundary, and the well trajectories; receiving PVT data, relative permeability, capillary pressure, and fluid contacts for the crude 3D model; importing bottomhole pressures, well control data, and production data for the crude 3D model; simplifying production data for the crude 3D model; determining that an acceptable level of simplification exists in the crude 3D model; simplifying well trajectories for the crude 3D model; optimizing grids for the crude 3D model; generating refined grids from the optimized grids; and producing a functional 3D model using the refined grids. From 1604, method 1600 proceeds to 1606.

At 1606, an intermediate 3D model is generated by calibrating the functional 3D model with single-well data. As an example, an intermediate 3D model can be generated as described with reference to FIG. 7. In some implementations, generating the intermediate 3D model by calibrating the functional 3D model with single-well data can include: activating the functional 3D model in an operational platform; executing the functional 3D model initially, and extracting pressure derivatives of actual data of buildup or falloff of selected wells from log-log plots; performing pressure transient interpretation; estimating a radius of investigation with a bounded region around a well, and testing a volume during a buildup or falloff period; running the functional 3D model to generate simulated pressures for a selected well; extracting pressure derivatives from a log-log plot of simulated buildup or falloff pressures; comparing derivatives of simulated pressure responses obtained from the functional 3D model to derivatives of measured pressure data; determining that an acceptable match exists between simulated data and actual data; calibrating the functional 3D model with selective tools; and completing the intermediate 3D model from the calibrated functional 3D model. In some implementations, the selective tools can include a permeability multiplier, an introduction of reservoir heterogeneity, and an adjustment of one or more of a vertical permeability, a skin factor, an effective well length, a bounded region, and a tested volume. From 1606, method 1600 proceeds to 1608.

At 1608, an advanced 3D model is generated by calibrating multi-well data in the functional 3D model. For example, an advanced 3D model can be generated as described with reference to FIG. 9. In some implementations, generating the advanced 3D transient model by calibrating the multi-well data in the functional 3D model can include: pre-setting a run time in the intermediate 3D model; optimizing grids for multiple wells in the intermediate 3D model; running the intermediate 3D model and activating all wells with their respective bounding regions; comparing simulated bottomhole pressures with actual data; determining that an acceptable match exists between simulated data and the actual data for each well, including identifying wells showing differences between the simulated bottomhole pressures and the actual data; and completing the advanced 3D transient model. In some implementations, identifying wells showing differences between the simulated bottomhole pressures and the actual data includes using a permeability multiplier in intermediate zones between wells, creating new intermediate zones if necessary to enhance matching, and varying sizes of intermediate zones. After 1608, method 1600 can stop.

In some implementations, method 1600 can include providing a 3D display of each of the crude 3D model, the functional 3D model, the intermediate 3D model, and the advanced 3D transient model. For example, displays similar to the graphs described with reference to FIGS. 11-15 can be provided in a user interface.

Figure 17:
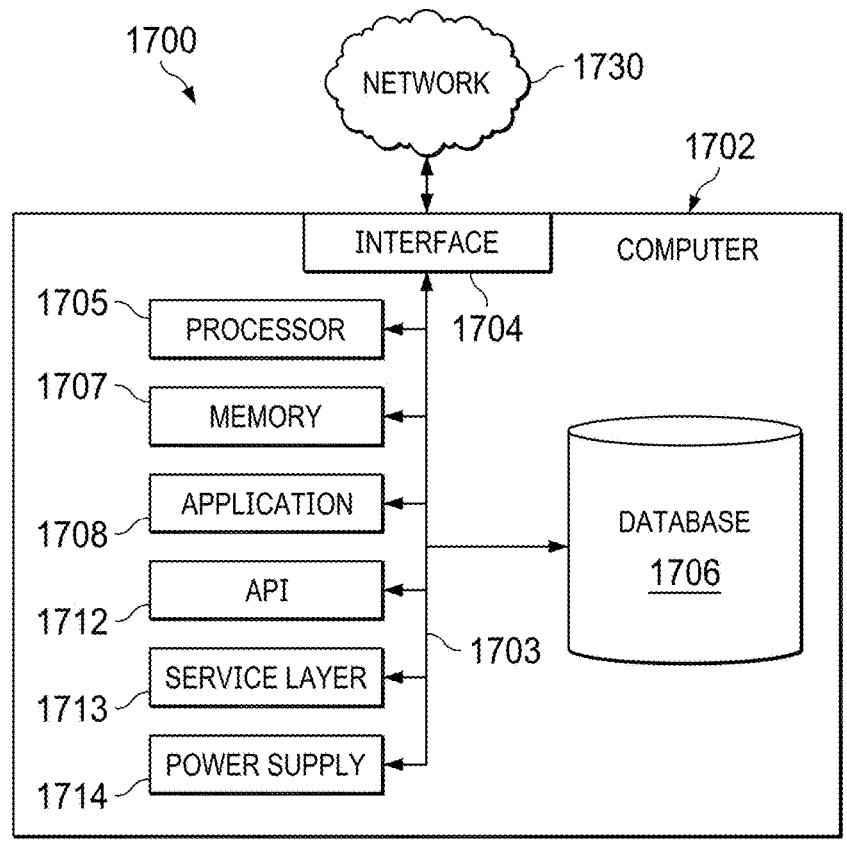
FIG. 17 is a block diagram illustrating an example computer system used to provide computational functionalities associated with described algorithms, methods, functions, processes, flows, and procedures as described in the present disclosure, according to some implementations of the present disclosure.

FIG. 17 is a block diagram of an example computer system 1700 used to provide computational functionalities associated with described algorithms, methods, functions, processes, flows, and procedures described in the present disclosure, according to some implementations of the present disclosure. The illustrated computer 1702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1702 can include input devices such as keypads, keyboards, and touch screens that can accept user information. Also, the computer 1702 can include output devices that can convey information associated with the operation of the computer 1702. The information can include digital data, visual data, audio information, or a combination of information. The information can be presented in a graphical user interface (UI) (or GUI).

The computer 1702 can serve in a role as a client, a network component, a server, a database, a persistency, or components of a computer system for performing the subject matter described in the present disclosure. The illustrated computer 1702 is communicably coupled with a network 1730. In some implementations, one or more components of the computer 1702 can be configured to operate within different environments, including cloud-computing-based environments, local environments, global environments, and combinations of environments.

At a top level, the computer 1702 is an electronic computing device operable to receive, transmit, process, store, and manage data and information associated with the described subject matter. According to some implementations, the computer 1702 can also include, or be communicably coupled with, an application server, an email server, a web server, a caching server, a streaming data server, or a combination of servers.

The computer 1702 can receive requests over network 1730 from a client application (for example, executing on another computer 1702). The computer 1702 can respond to the received requests by processing the received requests using software applications. Requests can also be sent to the computer 1702 from internal users (for example, from a command console), external (or third) parties, automated applications, entities, individuals, systems, and computers.

Each of the components of the computer 1702 can communicate using a system bus 1703. In some implementations, any or all of the components of the computer 1702, including hardware or software components, can interface with each other or the interface 1704 (or a combination of both) over the system bus 1703. Interfaces can use an application programming interface (API) 1712, a service layer 1713, or a combination of the API 1712 and service layer 1713. The API 1712 can include specifications for routines, data structures, and object classes. The API 1712 can be either computer-language independent or dependent. The API 1712 can refer to a complete interface, a single function, or a set of APIs.

The service layer 1713 can provide software services to the computer 1702 and other components (whether illustrated or not) that are communicably coupled to the computer 1702. The functionality of the computer 1702 can be accessible for all service consumers using this service layer. Software services, such as those provided by the service layer 1713, can provide reusable, defined functionalities through a defined interface. For example, the interface can be software written in JAVA, C++, or a language providing data in extensible markup language (XML) format. While illustrated as an integrated component of the computer 1702, in alternative implementations, the API 1712 or the service layer 1713 can be stand-alone components in relation to other components of the computer 1702 and other components communicably coupled to the computer 1702. Moreover, any or all parts of the API 1712 or the service layer 1713 can be implemented as child or sub-modules of another software module, enterprise application, or hardware module without departing from the scope of the present disclosure.

The computer 1702 includes an interface 1704. Although illustrated as a single interface 1704 in FIG. 17, two or more interfaces 1704 can be used according to particular needs, desires, or particular implementations of the computer 1702 and the described functionality. The interface 1704 can be used by the computer 1702 for communicating with other systems that are connected to the network 1730 (whether illustrated or not) in a distributed environment. Generally, the interface 1704 can include, or be implemented using, logic encoded in software or hardware (or a combination of software and hardware) operable to communicate with the network 1730. More specifically, the interface 1704 can include software supporting one or more communication protocols associated with communications. As such, the network 1730 or the interface's hardware can be operable to communicate physical signals within and outside of the illustrated computer 1702.

The computer 1702 includes a processor 1705. Although illustrated as a single processor 1705 in FIG. 17, two or more processors 1705 can be used according to particular needs, desires, or particular implementations of the computer 1702 and the described functionality. Generally, the processor 1705 can execute instructions and can manipulate data to perform the operations of the computer 1702, including operations using algorithms, methods, functions, processes, flows, and procedures as described in the present disclosure.

The computer 1702 also includes a database 1706 that can hold data for the computer 1702 and other components connected to the network 1730 (whether illustrated or not). For example, database 1706 can be an in-memory, conventional, or a database storing data consistent with the present disclosure. In some implementations, database 1706 can be a combination of two or more different database types (for example, hybrid in-memory and conventional databases) according to particular needs, desires, or particular implementations of the computer 1702 and the described functionality. Although illustrated as a single database 1706 in FIG. 17, two or more databases (of the same, different, or combination of types) can be used according to particular needs, desires, or particular implementations of the computer 1702 and the described functionality. While database 1706 is illustrated as an internal component of the computer 1702, in alternative implementations, database 1706 can be external to the computer 1702.

The computer 1702 also includes a memory 1707 that can hold data for the computer 1702 or a combination of components connected to the network 1730 (whether illustrated or not). Memory 1707 can store any data consistent with the present disclosure. In some implementations, memory 1707 can be a combination of two or more different types of memory (for example, a combination of semiconductor and magnetic storage) according to particular needs, desires, or particular implementations of the computer 1702 and the described functionality. Although illustrated as a single memory 1707 in FIG. 17, two or more memories 1707 (of the same, different, or combination of types) can be used according to particular needs, desires, or particular implementations of the computer 1702 and the described functionality. While memory 1707 is illustrated as an internal component of the computer 1702, in alternative implementations, memory 1707 can be external to the computer 1702.

The application 1708 can be an algorithmic software engine providing functionality according to particular needs, desires, or particular implementations of the computer 1702 and the described functionality. For example, application 1708 can serve as one or more components, modules, or applications. Further, although illustrated as a single application 1708, the application 1708 can be implemented as multiple applications 1708 on the computer 1702. In addition, although illustrated as internal to the computer 1702, in alternative implementations, the application 1708 can be external to the computer 1702.

The computer 1702 can also include a power supply 1714. The power supply 1714 can include a rechargeable or non-rechargeable battery that can be configured to be either user- or non-user-replaceable. In some implementations, the power supply 1714 can include power-conversion and management circuits, including recharging, standby, and power management functionalities. In some implementations, the power-supply 1714 can include a power plug to allow the computer 1702 to be plugged into a wall socket or a power source to, for example, power the computer 1702 or recharge a rechargeable battery.

There can be any number of computers 1702 associated with, or external to, a computer system containing computer 1702, with each computer 1702 communicating over network 1730. Further, the terms "client," "user," and other appropriate terminology can be used interchangeably, as appropriate, without departing from the scope of the present disclosure. Moreover, the present disclosure contemplates that many users can use one computer 1702 and one user can use multiple computers 1702.

Described implementations of the subject matter can include one or more features, alone or in combination.

For example, in a first implementation, a computer-implemented method includes the following. A crude 3D model is generated from a full-field geological model that models production for multiple wells in an area. A functional 3D model is generated from the crude 3D model. An intermediate 3D model is generated by calibrating the functional 3D model with single-well data. An advanced 3D transient model is generated by calibrating multi-well data in the functional 3D model.

The foregoing and other described implementations can each, optionally, include one or more of the following features:

A first feature, combinable with any of the following features, where generating the functional 3D model from the crude 3D model includes: activating the crude 3D model in an operatonal platform; generating a quality assurance and quality control (QAQC) structure, reservoir properties, a sector boundary, and well trajectories from the crude 3D model; determinating that an acceptable level of consistency exists in the QAQC structure, the reservoir properties, the sector boundary, and the well trajectories; receiving pressure, volume, and temperature (PVT) data, relative permeability, capillary pressure, and fluid contacts for the crude 3D model; importing bottomhole pressures, well control data, and production data for the crude 3D model; simplifying production data for the crude 3D model; determining that an acceptable level of simplification exists in the crude 3D model; simplifying well trajectories for the crude 3D model; optimizing grids for the crude 3D model; generating refined grids from the optimized grids; and producing a functional 3D model using the refined grids.

A second feature, combinable with any of the previous or following features, where generating the functional 3D model from the crude 3D model includes simplifying the functional 3D model to reduce a number of grids along horizontal sections of the functional 3D model.

A third feature, combinable with any of the previous or following features, where generating the intermediate 3D model by calibrating the functional 3D model with single-well data includes: activating the functional 3D model in an operational platform; executing the functional 3D model initially, and extracting pressure derivatives of actual data of buildup or falloff of selected wells from log-log plots; performing pressure transient interpretation; estimating a radius of investigation with a bounded region around a well, and testing a volume during a buildup or falloff period; running the functional 3D model to generate simulated pressures for a selected well; extracting pressure derivatives from a log-log plot of simulated buildup or falloff pressures; comparing derivatives of simulated pressure responses obtained from the functional 3D model to derivatives of measured pressure data; determining that an acceptable match exists between simulated data and actual data; calibrating the functional 3D model with selective tools; and completing the intermediate 3D model from the calibrated functional 3D model.

A fourth feature, combinable with any of the previous or following features, where the selective tools include a permeability multiplier, an introduction of reservoir heterogeneity, and an adjustment of one or more of a vertical permeability, a skin factor, an effective well length, a bounded region, and a tested volume.

A fifth feature, combinable with any of the previous or following features, where generating the advanced 3D transient model by calibrating the multi-well data in the functional 3D model includes: pre-setting a run time in the intermediate 3D model; optimizing grids for multiple wells in the intermediate 3D model; running the intermediate 3D model and activating all wells with their respective bounding regions; comparing simulated bottomhole pressures with actual data; determining that an acceptable match exists between simulated data and the actual data for each well, including identifying wells showing differences between the simulated bottomhole pressures and the actual data; and completing the advanced 3D transient model.

A sixth feature, combinable with any of the previous or following features, where identifying wells showing differences between the simulated bottomhole pressures and the actual data includes using a permeability multiplier in intermediate zones between wells, creating new intermediate zones if necessary to enhance matching, and varying sizes of intermediate zones.

A seventh feature, combinable with any of the previous or following features, the method further including providing a 3D display of each of the crude 3D model, the functional 3D model, the intermediate 3D model, and the advanced 3D transient model.

In a second implementation, a non-transitory, computer-readable medium stores one or more instructions executable by a computer system to perform operations including the following. A crude 3D model is generated from a full-field geological model that models production for multiple wells in an area. A functional 3D model is generated from the crude 3D model. An intermediate 3D model is generated by calibrating the functional 3D model with single-well data. An advanced 3D transient model is generated by calibrating multi-well data in the functional 3D model.

The foregoing and other described implementations can each, optionally, include one or more of the following features:

A first feature, combinable with any of the following features, where generating the functional 3D model from the crude 3D model includes: activating the crude 3D model in an operational platform; generating a quality assurance and quality control (QAQC) structure, reservoir properties, a sector boundary, and well trajectories from the crude 3D model; determining that an acceptable level of consistency exists in the QAQC structure, the reservoir properties, the sector boundary, and the well trajectories; receiving pressure, volume, and temperature (PVT) data, relative permeability, capillary pressure, and fluid contacts for the crude 3D model; importing bottomhole pressures, well control data, and production data for the crude 3D model; simplifying production data for the crude 3D model; determining that an acceptable level of simplification exists in the crude 3D model; simplifying well trajectories for the crude 3D model; optimizing grids for the crude 3D model; generating refined grids from the optimized grids; and producing a functional 3D model using the refined grids.

A second feature, combinable with any of the previous or following features, where generating the functional 3D model from the crude 3D model includes simplifying the functional 3D model to reduce a number of grids along horizontal sections of the functional 3D model.

A third feature, combinable with any of the previous or following features, where generating the intermediate 3D model by calibrating the functional 3D model with single-well data includes: activating the functional 3D model in an operational platform; executing the functional 3D model initially, and extracting pressure derivatives of actual data of buildup or falloff of selected wells from log-log plots; performing pressure transient interpretation; estimating a radius of investigation with a bounded region around a well, and testing a volume during a buildup or falloff period; running the functional 3D model to generate simulated pressures for a selected well; extracting pressure derivatives from a log-log plot of simulated buildup or falloff pressures; comparing derivatives of simulated pressure responses obtained from the functional 3D model to derivatives of measured pressure data; determining that an acceptable match exists between simulated data and actual data; calibrating the functional 3D model with selective tools; and completing the intermediate 3D model from the calibrated functional 3D model.

A fourth feature, combinable with any of the previous or following features, where the selective tools include a permeability multiplier, an introduction of reservoir heterogeneity, and an adjustment of one or more of a vertical permeability, a skin factor, an effective well length, a bounded region, and a tested volume.

A fifth feature, combinable with any of the previous or following features, where generating the advanced 3D transient model by calibrating the multi-well data in the functional 3D model includes: pre-setting a run time in the intermediate 3D model; optimizing grids for multiple wells in the intermediate 3D model; running the intermediate 3D model and activating all wells with their respective bounding regions; comparing simulated bottomhole pressures with actual data; determining that an acceptable match exists between simulated data and the actual data for each well, including identifying wells showing differences between the simulated bottomhole pressures and the actual data; and completing the advanced 3D transient model.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A crude 3D model is generated from a full-field geological model that models production for multiple wells in an area. A functional 3D model is generated from the crude 3D model. An intermediate 3D model is generated by calibrating the functional 3D model with single-well data. An advanced 3D transient model is generated by calibrating multi-well data in the functional 3D model.

The foregoing and other described implementations can each, optionally, include one or more of the following features:

A first feature, combinable with any of the following features, where generating the functional 3D model from the crude 3D model includes: activating the crude 3D model in an operational platform; generating a quality assurance and quality control (QAQC) structure, reservoir properties, a sector boundary, and well trajectories from the crude 3D model; determining that an acceptable level of consistency exists in the QAQC structure, the reservoir properties, the sector boundary, and the well trajectories; receiving pressure, volume, and temperature (PVT) data, relative permeability, capillary pressure, and fluid contacts for the crude 3D model; importing bottomhole pressures, well control data, and production data for the crude 3D model; simplifying production data for the crude 3D model; determining that an acceptable level of simplification exists in the crude 3D model; simplifying well trajectories for the crude 3D model; optimizing grids for the crude 3D model; generating refined grids from the optimized grids; and producing a functional 3D model using the refined grids.

A second feature, combinable with any of the previous or following features, where generating the functional 3D model from the crude 3D model includes simplifying the functional 3D model to reduce a number of grids along horizontal sections of the functional 3D model.

A third feature, combinable with any of the previous or following features, where generating the intermediate 3D model by calibrating the functional 3D model with single-well data includes: activating the functional 3D model in an operational platform; executing the functional 3D model initially, and extracting pressure derivatives of actual data of buildup or falloff of selected wells from log-log plots; performing pressure transient interpretation; estimating a radius of investigation with a bounded region around a well, and testing a volume during a buildup or falloff period; running the functional 3D model to generate simulated pressures for a selected well; extracting pressure derivatives from a log-log plot of simulated buildup or falloff pressures; comparing derivatives of simulated pressure responses obtained from the functional 3D model to derivatives of measured pressure data; determining that an acceptable match exists between simulated data and actual data; calibrating the functional 3D model with selective tools; and completing the intermediate 3D model from the calibrated functional 3D model.

A fourth feature, combinable with any of the previous or following features, where the selective tools include a permeability multiplier, an introduction of reservoir heterogeneity, and an adjustment of one or more of a vertical permeability, a skin factor, an effective well length, a bounded region, and a tested volume.

A fifth feature, combinable with any of the previous or following features, where generating the advanced 3D transient model by calibrating the multi-well data in the functional 3D model includes: pre-setting a run time in the intermediate 3D model; optimizing grids for multiple wells in the intermediate 3D model; running the intermediate 3D model and activating all wells with their respective bounding regions; comparing simulated bottomhole pressures with actual data; determining that an acceptable match exists between simulated data and the actual data for each well, including identifying wells showing differences between the simulated bottomhole pressures and the actual data; and completing the advanced 3D transient model.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
generating a crude three-dimensional (3D) model from a full-field geological model modeling production for multiple wells in an area;
generating a functional 3D model from the crude 3D model, wherein generating the functional 3D model from the crude 3D model includes simplifying the functional 3D model to reduce a number of grids along horizontal sections of the functional 3D model;
receiving, from a well equipped with permanent downhole and surface pressure sensors and flowmeters, real-time single-well data including continuous and high-resolution measurements of pressures and production rates obtained from the well;
generating an intermediate 3D model by calibrating the functional 3D model with single-well data; and
generating an advanced 3D transient model by calibrating multi-well data in the functional 3D model.

2. The computer-implemented method of claim 1, wherein generating the functional 3D model from the crude 3D model comprises:
activating the crude 3D model in an operational platform;
generating a quality assurance and quality control (QAQC) structure, reservoir properties, a sector boundary, and well trajectories from the crude 3D model;
determining that an acceptable level of consistency exists in the QAQC structure, the reservoir properties, the sector boundary, and the well trajectories;
receiving pressure, volume, and temperature (PVT) data, relative permeability, capillary pressure, and fluid contacts for the crude 3D model;
importing bottomhole pressures, well control data, and production data for the crude 3D model;
simplifying production data for the crude 3D model;
determining that an acceptable level of simplification exists in the crude 3D model;
simplifying well trajectories for the crude 3D model;
optimizing grids for the crude 3D model;
generating refined grids from the optimized grids; and
producing a functional 3D model using the refined grids.

3. The computer-implemented method of claim 1, wherein generating the intermediate 3D model by calibrating the functional 3D model with single-well data comprises:
activating the functional 3D model in an operational platform;
executing the functional 3D model initially, and extracting pressure derivatives of actual data of buildup or falloff of selected wells from log-log plots;
performing pressure transient interpretation;
estimating a radius of investigation with a bounded region around a well, and testing a volume during a buildup or falloff period;
running the functional 3D model to generate simulated pressures for a selected well;
extracting pressure derivatives from a log-log plot of simulated buildup or falloff pressures;
comparing derivatives of simulated pressure responses obtained from the functional 3D model to derivatives of measured pressure data;
determining that an acceptable match exists between simulated data and actual data;
calibrating the functional 3D model with selective tools; and
completing the intermediate 3D model from the calibrated functional 3D model.

4. The computer-implemented method of claim 3, wherein the selective tools include a permeability multiplier, an introduction of reservoir heterogeneity, and an adjustment of one or more of a vertical permeability, a skin factor, an effective well length, a bounded region, and a tested volume.

5. The computer-implemented method of claim 1, wherein generating the advanced 3D transient model by calibrating the multi-well data in the functional 3D model comprises:
pre-setting a run time in the intermediate 3D model;
optimizing grids for multiple wells in the intermediate 3D model;
running the intermediate 3D model and activating all wells with their respective bounding regions;
comparing simulated bottomhole pressures with actual data;
determining that an acceptable match exists between simulated data and the actual data for each well, including identifying wells showing differences between the simulated bottomhole pressures and the actual data; and
completing the advanced 3D transient model.

6. The computer-implemented method of claim 5, wherein identifying wells showing differences between the simulated bottomhole pressures and the actual data includes using a permeability multiplier in intermediate zones between wells, creating new intermediate zones if necessary to enhance matching, and varying sizes of intermediate zones.

7. The computer-implemented method of claim 1, further comprising providing a 3D display of each of the crude 3D model, the functional 3D model, the intermediate 3D model, and the advanced 3D transient model.

8. A non-transitory, computer-readable medium storing one or more instructions executable by a computer system to perform operations comprising:
generating a crude three-dimensional (3D) model from a full-field geological model modeling production for multiple wells in an area;
generating a functional 3D model from the crude 3D model, wherein generating the functional 3D model from the crude 3D model includes simplifying the functional 3D model to reduce a number of grids along horizontal sections of the functional 3D model;
receiving, from a well equipped with permanent downhole and surface pressure sensors and flowmeters, real-time single-well data including continuous and high-resolution measurements of pressures and production rates obtained from the well;
generating an intermediate 3D model by calibrating the functional 3D model with single-well data; and
generating an advanced 3D transient model by calibrating multi-well data in the functional 3D model.

9. The non-transitory, computer-readable medium of claim 8, wherein generating the functional 3D model from the crude 3D model comprises:
activating the crude 3D model in an operational platform;
generating a quality assurance and quality control (QAQC) structure, reservoir properties, a sector boundary, and well trajectories from the crude 3D model;

determining that an acceptable level of consistency exists in the QAQC structure, the reservoir properties, the sector boundary, and the well trajectories;
receiving pressure, volume, and temperature (PVT) data, relative permeability, capillary pressure, and fluid contacts for the crude 3D model;
importing bottomhole pressures, well control data, and production data for the crude 3D model;
simplifying production data for the crude 3D model;
determining that an acceptable level of simplification exists in the crude 3D model;
simplifying well trajectories for the crude 3D model;
optimizing grids for the crude 3D model;
generating refined grids from the optimized grids; and
producing a functional 3D model using the refined grids.

10. The non-transitory, computer-readable medium of claim 8, wherein generating the intermediate 3D model by calibrating the functional 3D model with single-well data comprises:
activating the functional 3D model in an operational platform;
executing the functional 3D model initially, and extracting pressure derivatives of actual data of buildup or falloff of selected wells from log-log plots;
performing pressure transient interpretation;
estimating a radius of investigation with a bounded region around a well, and testing a volume during a buildup or falloff period;
running the functional 3D model to generate simulated pressures for a selected well;
extracting pressure derivatives from a log-log plot of simulated buildup or falloff pressures;
comparing derivatives of simulated pressure responses obtained from the functional 3D model to derivatives of measured pressure data;
determining that an acceptable match exists between simulated data and actual data;
calibrating the functional 3D model with selective tools; and
completing the intermediate 3D model from the calibrated functional 3D model.

11. The non-transitory, computer-readable medium of claim 10, wherein the selective tools include a permeability multiplier, an introduction of reservoir heterogeneity, and an adjustment of one or more of a vertical permeability, a skin factor, an effective well length, a bounded region, and a tested volume.

12. The non-transitory, computer-readable medium of claim 8, wherein generating the advanced 3D transient model by calibrating the multi-well data in the functional 3D model comprises:
pre-setting a run time in the intermediate 3D model;
optimizing grids for multiple wells in the intermediate 3D model;
running the intermediate 3D model and activating all wells with their respective bounding regions;
comparing simulated bottomhole pressures with actual data;
determining that an acceptable match exists between simulated data and the actual data for each well, including identifying wells showing differences between the simulated bottomhole pressures and the actual data; and
completing the advanced 3D transient model.

13. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
generating a crude three-dimensional (3D) model from a full-field geological model modeling production for multiple wells in an area;
generating a functional 3D model from the crude 3D model, wherein generating the functional 3D model from the crude 3D model includes simplifying the functional 3D model to reduce a number of grids along horizontal sections of the functional 3D model;
receiving, from a well equipped with permanent downhole and surface pressure sensors and flowmeters, real-time single-well data including continuous and high-resolution measurements of pressures and production rates obtained from the well;
generating an intermediate 3D model by calibrating the functional 3D model with single-well data; and
generating an advanced 3D transient model by calibrating multi-well data in the functional 3D model.

14. The computer-implemented system of claim 13, wherein generating the functional 3D model from the crude 3D model comprises:
activating the crude 3D model in an operational platform;
generating a quality assurance and quality control (QAQC) structure, reservoir properties, a sector boundary, and well trajectories from the crude 3D model;
determining that an acceptable level of consistency exists in the QAQC structure, the reservoir properties, the sector boundary, and the well trajectories;
receiving pressure, volume, and temperature (PVT) data, relative permeability, capillary pressure, and fluid contacts for the crude 3D model;
importing bottomhole pressures, well control data, and production data for the crude 3D model;
simplifying production data for the crude 3D model;
determining that an acceptable level of simplification exists in the crude 3D model;
simplifying well trajectories for the crude 3D model;
optimizing grids for the crude 3D model;
generating refined grids from the optimized grids; and
producing a functional 3D model using the refined grids.

15. The computer-implemented system of claim 13, wherein generating the intermediate 3D model by calibrating the functional 3D model with single-well data comprises:
activating the functional 3D model in an operational platform;
executing the functional 3D model initially, and extracting pressure derivatives of actual data of buildup or falloff of selected wells from log-log plots;
performing pressure transient interpretation;
estimating a radius of investigation with a bounded region around a well, and testing a volume during a buildup or falloff period;
running the functional 3D model to generate simulated pressures for a selected well;
extracting pressure derivatives from a log-log plot of simulated buildup or falloff pressures;
comparing derivatives of simulated pressure responses obtained from the functional 3D model to derivatives of measured pressure data;

determining that an acceptable match exists between simulated data and actual data;

calibrating the functional 3D model with selective tools; and completing the intermediate 3D model from the calibrated functional 3D model.

16. The computer-implemented system of claim 15, wherein the selective tools include a permeability multiplier, an introduction of reservoir heterogeneity, and an adjustment of one or more of a vertical permeability, a skin factor, an effective well length, a bounded region, and a tested volume.

17. The computer-implemented system of claim 13, wherein generating the advanced 3D transient model by calibrating the multi-well data in the functional 3D model comprises:

pre-setting a run time in the intermediate 3D model;

optimizing grids for multiple wells in the intermediate 3D model;

running the intermediate 3D model and activating all wells with their respective bounding regions;

comparing simulated bottomhole pressures with actual data;

determining that an acceptable match exists between simulated data and the actual data for each well, including identifying wells showing differences between the simulated bottomhole pressures and the actual data; and completing the advanced 3D transient model.

* * * * *